(12) United States Patent
Pivac et al.

(10) Patent No.: US 11,441,899 B2
(45) Date of Patent: Sep. 13, 2022

(54) REAL TIME POSITION AND ORIENTATION TRACKER

(71) Applicant: FASTBRICK IP PTY LTD, High Wycombe (AU)

(72) Inventors: Mark Joseph Pivac, Lesmurdie (AU); Cosimo Santella, Como (AU)

(73) Assignee: FASTBRICK IP PTY LTD, High Wycombe (AU)

( * ) Notice: Subject to any disclaimer, the term of this patent is extended or adjusted under 35 U.S.C. 154(b) by 217 days.

(21) Appl. No.: 16/628,251

(22) PCT Filed: Jul. 5, 2018

(86) PCT No.: PCT/AU2018/050698
§ 371 (c)(1),
(2) Date: Jan. 2, 2020

(87) PCT Pub. No.: WO2019/006511
PCT Pub. Date: Jan. 10, 2019

(65) Prior Publication Data
US 2020/0173777 A1   Jun. 4, 2020

(30) Foreign Application Priority Data

Jul. 5, 2017  (AU) .............................. 2017902623

(51) Int. Cl.
*G06T 7/292*    (2017.01)
*G01C 1/04*     (2006.01)
(Continued)

(52) U.S. Cl.
CPC ............... *G01C 11/30* (2013.01); *G01C 1/04* (2013.01); *G06T 7/0004* (2013.01); *G06T 7/292* (2017.01)

(58) Field of Classification Search
None
See application file for complete search history.

(56) References Cited

U.S. PATENT DOCUMENTS

| 1,633,192 A | 6/1927 | Reagan |
| 1,829,435 A | 10/1931 | Barnhart |

(Continued)

FOREIGN PATENT DOCUMENTS

| AU | 645640 B2 | 1/1994 |
| CH | 673498 A | 3/1990 |

(Continued)

OTHER PUBLICATIONS

Delgado, R. et al.: "Development and Control of an Omnidirectional Mobile Robot on an EtherCAT Network", International Journal of Applied Engineering Research, vol. 11, No. 21, 2016, pp. 10586-10592, XP055574484.

(Continued)

*Primary Examiner* — Idowu O Osifade
(74) *Attorney, Agent, or Firm* — Perkins Coie LLP

(57) ABSTRACT

The present disclosure relates to a tracking system for tracking the position and/or orientation of an object in an environment, the tracking system including: at least one camera mounted to the object; a plurality of spaced apart targets, at least some of said targets viewable by the at least one camera; and, one or more electronic processing devices configured to: determine target position data indicative of the relative spatial position of the targets; receive image data indicative of an image from the at least one camera, said image including at least some of the targets; process the image data to: identify one or more targets in the image; determine pixel array coordinates corresponding to a position of the one or more targets in the image; and, use the processed image data to determine the position and/or orientation of the object by triangulation.

32 Claims, 16 Drawing Sheets

(51) Int. Cl.
*G01C 11/30* (2006.01)
*G06T 7/00* (2017.01)

(56) References Cited

U.S. PATENT DOCUMENTS

| | | | |
|---|---|---|---|
| 3,438,171 A | 4/1969 | Demarest | |
| 3,757,484 A | 9/1973 | Williamson et al. | |
| 3,790,428 A | 2/1974 | Lingl | |
| RE28,305 E | 1/1975 | Williamson et al. | |
| 3,930,929 A | 1/1976 | Lingl | |
| 3,950,914 A | 4/1976 | Lowen | |
| 4,033,463 A | 7/1977 | Cervin | |
| 4,106,259 A | 8/1978 | Taylor-smith | |
| 4,221,258 A | 9/1980 | Richard | |
| 4,245,451 A | 1/1981 | Taylor-smith | |
| 4,303,363 A | 12/1981 | Cervin | |
| 4,523,100 A | 6/1985 | Payne | |
| 4,708,562 A | 11/1987 | Melan et al. | |
| 4,714,339 A | 12/1987 | Lau | |
| 4,758,036 A | 7/1988 | Legille et al. | |
| 4,765,789 A | 8/1988 | Lonardi et al. | |
| 4,790,651 A | 12/1988 | Brown et al. | |
| 4,827,689 A | 5/1989 | Lonardi et al. | |
| 4,852,237 A | 8/1989 | Tradt et al. | |
| 4,911,595 A | 3/1990 | Kirchen et al. | |
| 4,945,493 A | 7/1990 | Huang et al. | |
| 4,952,772 A | 8/1990 | Zana | |
| 4,954,762 A | 9/1990 | Miyake et al. | |
| 4,969,789 A | 11/1990 | Searle | |
| 5,004,844 A | 4/1991 | Van et al. | |
| 5,013,986 A | 5/1991 | Gauggel | |
| 5,018,923 A | 5/1991 | Melan et al. | |
| 5,049,797 A | 9/1991 | Phillips | |
| 5,080,415 A | 1/1992 | Bjornson | |
| 5,196,900 A | 3/1993 | Pettersen | |
| 5,284,000 A | 2/1994 | Milne et al. | |
| 5,321,353 A | 6/1994 | Furness | |
| 5,403,140 A | 4/1995 | Carmichael et al. | |
| 5,413,454 A | 5/1995 | Movsesian | |
| 5,419,669 A | 5/1995 | Kremer et al. | |
| 5,420,489 A | 5/1995 | Hansen et al. | |
| 5,469,531 A | 11/1995 | Faure et al. | |
| 5,497,061 A | 3/1996 | Nonaka et al. | |
| 5,523,663 A | 6/1996 | Tsuge et al. | |
| 5,527,145 A | 6/1996 | Duncan | |
| 5,557,397 A | 9/1996 | Hyde et al. | |
| 5,737,500 A | 4/1998 | Seraji et al. | |
| 5,838,882 A | 11/1998 | Gan et al. | |
| 6,018,923 A | 2/2000 | Wendt | |
| 6,049,377 A | 4/2000 | Lau et al. | |
| 6,101,455 A | 8/2000 | Davis | |
| 6,134,507 A | 10/2000 | Markey, Jr. et al. | |
| 6,166,809 A | 12/2000 | Pettersen et al. | |
| 6,166,811 A | 12/2000 | Long et al. | |
| 6,172,754 B1 | 1/2001 | Niebuhr | |
| 6,213,309 B1 | 4/2001 | Dadisho | |
| 6,285,959 B1 | 9/2001 | Greer | |
| 6,310,644 B1 * | 10/2001 | Keightley | G01B 11/005 348/140 |
| 6,330,503 B1 | 12/2001 | Sharp et al. | |
| 6,370,837 B1 | 4/2002 | Mcmahon et al. | |
| 6,427,122 B1 | 7/2002 | Lin | |
| 6,429,016 B1 | 8/2002 | Mcneil | |
| 6,512,993 B2 | 1/2003 | Kacyra et al. | |
| 6,516,272 B2 | 2/2003 | Lin | |
| 6,584,378 B1 | 6/2003 | Anfindsen | |
| 6,611,141 B1 | 8/2003 | Schulz | |
| 6,618,496 B1 | 9/2003 | Tassakos et al. | |
| 6,628,322 B1 | 9/2003 | Cerruti | |
| 6,643,002 B2 | 11/2003 | Drake, Jr. | |
| 6,664,529 B2 | 12/2003 | Pack et al. | |
| 6,681,145 B1 | 1/2004 | Greenwood et al. | |
| 6,683,694 B2 | 1/2004 | Cornil | |
| 6,704,619 B1 | 3/2004 | Coleman et al. | |
| 6,741,364 B2 | 5/2004 | Lange et al. | |
| 6,825,937 B1 | 11/2004 | Gebauer et al. | |
| 6,850,946 B1 | 2/2005 | Rappaport et al. | |
| 6,859,729 B2 | 2/2005 | Breakfield et al. | |
| 6,864,966 B2 | 3/2005 | Giger | |
| 6,868,847 B2 | 3/2005 | Ainedter et al. | |
| 6,873,880 B2 | 3/2005 | Hooke et al. | |
| 6,917,893 B2 | 7/2005 | Dietsch et al. | |
| 6,935,036 B2 | 8/2005 | Barber et al. | |
| 6,957,496 B2 | 10/2005 | Raab et al. | |
| 6,965,843 B2 | 11/2005 | Hobden et al. | |
| 6,970,802 B2 | 11/2005 | Ban et al. | |
| 6,996,912 B2 | 2/2006 | Raab et al. | |
| 7,050,930 B2 | 5/2006 | Hobden et al. | |
| 7,051,450 B2 | 5/2006 | Barber et al. | |
| 7,069,664 B2 | 7/2006 | Barber et al. | |
| 7,107,144 B2 | 9/2006 | Capozzi et al. | |
| 7,111,437 B2 | 9/2006 | Ainedter | |
| 7,130,034 B2 | 10/2006 | Barvosa-carter et al. | |
| 7,142,981 B2 | 11/2006 | Hablani | |
| 7,145,647 B2 | 12/2006 | Suphellen et al. | |
| 7,153,454 B2 | 12/2006 | Khoshnevis | |
| 7,174,651 B2 | 2/2007 | Barber et al. | |
| 7,230,689 B2 | 6/2007 | Lau | |
| 7,246,030 B2 | 7/2007 | Raab et al. | |
| 7,269,910 B2 | 9/2007 | Raab et al. | |
| 7,347,311 B2 | 3/2008 | Rudge | |
| 7,519,493 B2 | 4/2009 | Atwell et al. | |
| 7,551,121 B1 | 6/2009 | Oconnell et al. | |
| 7,564,538 B2 | 7/2009 | Sakimura et al. | |
| 7,570,371 B1 | 8/2009 | Storm | |
| 7,576,836 B2 | 8/2009 | Bridges | |
| 7,576,847 B2 | 8/2009 | Bridges | |
| 7,591,078 B2 | 9/2009 | Crampton | |
| 7,639,347 B2 | 12/2009 | Eaton | |
| 7,693,325 B2 | 4/2010 | Pulla et al. | |
| 7,701,587 B2 | 4/2010 | Shioda et al. | |
| 7,774,159 B2 | 8/2010 | Cheng et al. | |
| 7,800,758 B1 | 9/2010 | Bridges et al. | |
| 7,804,602 B2 | 9/2010 | Raab | |
| RE42,055 E | 1/2011 | Raab et al. | |
| RE42,082 E | 2/2011 | Raab et al. | |
| 7,881,896 B2 | 2/2011 | Atwell et al. | |
| 7,967,549 B2 | 6/2011 | Geist et al. | |
| 7,993,289 B2 | 8/2011 | Quistgaard et al. | |
| 8,036,452 B2 | 10/2011 | Pettersson et al. | |
| 8,054,451 B2 | 11/2011 | Karazi et al. | |
| 8,060,344 B2 | 11/2011 | Stathis | |
| 8,145,446 B2 | 3/2012 | Atwell et al. | |
| 8,166,727 B2 | 5/2012 | Pivac et al. | |
| 8,169,604 B2 | 5/2012 | Braghiroli et al. | |
| 8,185,240 B2 | 5/2012 | Williams et al. | |
| 8,229,208 B2 | 7/2012 | Pulla et al. | |
| 8,233,153 B2 | 7/2012 | Knuettel | |
| 8,244,030 B2 | 8/2012 | Pettersson et al. | |
| 8,248,620 B2 | 8/2012 | Wicks et al. | |
| 8,269,984 B2 | 9/2012 | Hinderling et al. | |
| 8,327,555 B2 | 12/2012 | Champ | |
| 8,337,407 B2 | 12/2012 | Quistgaard et al. | |
| 8,345,926 B2 | 1/2013 | Clark et al. | |
| 8,346,392 B2 | 1/2013 | Walser et al. | |
| 8,405,716 B2 | 3/2013 | Yu et al. | |
| 8,467,072 B2 | 6/2013 | Cramer et al. | |
| 8,537,372 B2 | 9/2013 | Siercks et al. | |
| 8,537,376 B2 | 9/2013 | Day et al. | |
| 8,558,992 B2 | 10/2013 | Steffey | |
| 8,593,648 B2 | 11/2013 | Cramer et al. | |
| 8,595,948 B2 | 12/2013 | Raab et al. | |
| 8,606,399 B2 | 12/2013 | Williams et al. | |
| 8,634,950 B2 | 1/2014 | Simonetti et al. | |
| 8,644,964 B2 | 2/2014 | Hendron et al. | |
| 8,670,114 B2 | 3/2014 | Bridges et al. | |
| 8,677,643 B2 | 3/2014 | Bridges et al. | |
| 8,792,709 B2 | 7/2014 | Pulla et al. | |
| 8,803,055 B2 | 8/2014 | Lau et al. | |
| 8,812,155 B2 | 8/2014 | Brethe | |
| 8,825,208 B1 | 9/2014 | Benson | |
| 8,832,954 B2 | 9/2014 | Atwell et al. | |
| 8,848,203 B2 | 9/2014 | Bridges et al. | |
| 8,875,409 B2 | 11/2014 | Kretschmer et al. | |

(56) References Cited

U.S. PATENT DOCUMENTS

| | | |
|---|---|---|
| 8,898,919 B2 | 12/2014 | Bridges et al. |
| 8,902,408 B2 | 12/2014 | Bridges |
| 8,913,814 B2 | 12/2014 | Gandyra |
| 8,931,182 B2 | 1/2015 | Raab et al. |
| 8,942,940 B2 | 1/2015 | York |
| 8,965,571 B2 | 2/2015 | Peters et al. |
| 8,996,244 B2 | 3/2015 | Summer et al. |
| 8,997,362 B2 | 4/2015 | Briggs et al. |
| 9,020,240 B2 | 4/2015 | Pettersson et al. |
| 9,033,998 B1 | 5/2015 | Schaible et al. |
| RE45,565 E | 6/2015 | Bridges et al. |
| 9,046,360 B2 | 6/2015 | Atwell et al. |
| 9,074,381 B1 | 7/2015 | Drew |
| 9,109,877 B2 | 8/2015 | Thierman |
| 9,146,315 B2 | 9/2015 | Bosse et al. |
| 9,151,830 B2 | 10/2015 | Bridges |
| 9,163,922 B2 | 10/2015 | Bridges et al. |
| 9,170,096 B2 | 10/2015 | Fowler et al. |
| 9,188,430 B2 | 11/2015 | Atwell et al. |
| 9,207,309 B2 | 12/2015 | Bridges |
| 9,223,025 B2 | 12/2015 | Debrunner et al. |
| 9,229,108 B2 | 1/2016 | Debrunner et al. |
| 9,266,238 B2 | 2/2016 | Huettenhofer |
| 9,267,784 B2 | 2/2016 | Atwell et al. |
| 9,278,448 B2 | 3/2016 | Freeman |
| 9,279,661 B2 | 3/2016 | Tateno et al. |
| 9,303,988 B2 | 4/2016 | Tani |
| 9,353,519 B2 | 5/2016 | Williams |
| 9,354,051 B2 | 5/2016 | Dunne et al. |
| 9,358,688 B2 | 6/2016 | Drew |
| 9,367,741 B2 | 6/2016 | Le Marec |
| 9,377,301 B2 | 6/2016 | Neier et al. |
| 9,383,200 B2 | 7/2016 | Hulm et al. |
| 9,395,174 B2 | 7/2016 | Bridges |
| 9,405,293 B2 | 8/2016 | Meuleau |
| 9,423,282 B2 | 8/2016 | Moy |
| 9,437,005 B2 | 9/2016 | Tateno et al. |
| 9,443,308 B2 | 9/2016 | Pettersson et al. |
| 9,452,533 B2 | 9/2016 | Calkins et al. |
| 9,454,818 B2 | 9/2016 | Cramer |
| 9,476,695 B2 | 10/2016 | Becker et al. |
| 9,482,524 B2 | 11/2016 | Metzler et al. |
| 9,482,525 B2 | 11/2016 | Bridges |
| 9,482,746 B2 | 11/2016 | Bridges |
| 9,494,686 B2 | 11/2016 | Maryfield et al. |
| 9,513,100 B2 | 12/2016 | Raab et al. |
| 9,536,163 B2 | 1/2017 | Veeser et al. |
| 9,541,371 B2 | 1/2017 | Pettersson et al. |
| 9,561,019 B2 | 2/2017 | Mihailescu et al. |
| 9,607,239 B2 | 3/2017 | Bridges et al. |
| 9,618,620 B2 | 4/2017 | Zweigle et al. |
| 9,658,061 B2 | 5/2017 | Wilson et al. |
| 9,671,221 B2 | 6/2017 | Ruhland et al. |
| 9,679,385 B2 | 6/2017 | Suzuki et al. |
| 9,686,532 B2 | 6/2017 | Tohme |
| 9,708,079 B2 | 7/2017 | Desjardien et al. |
| 9,715,730 B2 | 7/2017 | Suzuki |
| 9,720,087 B2 | 8/2017 | Christen et al. |
| 9,734,609 B2 | 8/2017 | Pulla et al. |
| 9,739,595 B2 | 8/2017 | Lau |
| 9,746,308 B2 | 8/2017 | Gong |
| 9,757,859 B1 | 9/2017 | Kolb et al. |
| 9,768,837 B2 | 9/2017 | Charvat et al. |
| 9,772,173 B2 | 9/2017 | Atwell et al. |
| 9,803,969 B2 | 10/2017 | Gong |
| 9,816,813 B2 | 11/2017 | Lettau et al. |
| 9,829,305 B2 | 11/2017 | Gong |
| 9,835,717 B2 | 12/2017 | Bosse et al. |
| 9,844,792 B2 | 12/2017 | Pettersson et al. |
| 9,879,976 B2 | 1/2018 | Bridges et al. |
| 9,897,442 B2 | 2/2018 | Pettersson et al. |
| 9,903,939 B2 | 2/2018 | Charvat et al. |
| 9,909,855 B2 | 3/2018 | Becker et al. |
| 9,915,733 B2 | 3/2018 | Fried et al. |
| 9,921,046 B2 | 3/2018 | Gong |
| 9,958,268 B2 | 5/2018 | Ohtomo et al. |
| 9,958,545 B2 | 5/2018 | Eichenholz et al. |
| 9,964,398 B2 | 5/2018 | Becker et al. |
| 9,964,402 B2 | 5/2018 | Tohme et al. |
| 9,967,545 B2 | 5/2018 | Tohme |
| 9,989,353 B2 | 6/2018 | Bartmann et al. |
| 10,012,732 B2 | 7/2018 | Eichenholz et al. |
| 10,030,972 B2 | 7/2018 | Iseli et al. |
| 10,041,793 B2 | 8/2018 | Metzler et al. |
| 10,054,422 B2 | 8/2018 | Böckem et al. |
| 10,058,394 B2 | 8/2018 | Johnson et al. |
| 10,073,162 B2 | 9/2018 | Charvat et al. |
| 10,074,889 B2 | 9/2018 | Charvat et al. |
| 10,082,521 B2 | 9/2018 | Atlas et al. |
| 10,090,944 B1 | 10/2018 | Charvat et al. |
| 10,094,909 B2 | 10/2018 | Charvat et al. |
| 10,126,415 B2 | 11/2018 | Becker et al. |
| 10,189,176 B2 | 1/2019 | Williams |
| 10,220,511 B2 | 3/2019 | Linnell et al. |
| 10,240,949 B2 | 3/2019 | Peters et al. |
| 10,876,308 B2 | 12/2020 | Pivac et al. |
| 11,106,836 B2 | 8/2021 | Pivac et al. |
| 2002/0176603 A1 | 11/2002 | Bauer et al. |
| 2003/0048459 A1 | 3/2003 | Gooch |
| 2003/0090682 A1 | 5/2003 | Gooch et al. |
| 2003/0120377 A1 | 6/2003 | Hooke et al. |
| 2003/0206285 A1 | 11/2003 | Lau |
| 2003/0208302 A1 | 11/2003 | Lemelson |
| 2004/0078137 A1 | 4/2004 | Breakfield et al. |
| 2004/0093119 A1 | 5/2004 | Gunnarsson et al. |
| 2004/0200947 A1 | 10/2004 | Lau |
| 2005/0007450 A1 | 1/2005 | Hill et al. |
| 2005/0057745 A1 | 3/2005 | Bontje |
| 2005/0060092 A1 | 3/2005 | Hablani |
| 2005/0086901 A1 | 4/2005 | Chisholm |
| 2005/0131619 A1 | 6/2005 | Rappaport et al. |
| 2005/0196484 A1 | 9/2005 | Khoshnevis |
| 2005/0252118 A1 | 11/2005 | Matsufuji |
| 2006/0167587 A1 | 7/2006 | Read |
| 2006/0215179 A1 | 9/2006 | Mcmurtry et al. |
| 2007/0024870 A1 | 2/2007 | Girard et al. |
| 2007/0229802 A1 | 10/2007 | Lau |
| 2007/0284215 A1 | 12/2007 | Rudge |
| 2008/0030855 A1 | 2/2008 | Lau |
| 2008/0189046 A1 | 8/2008 | Eliasson et al. |
| 2009/0038258 A1 | 2/2009 | Pivac et al. |
| 2009/0074979 A1 | 3/2009 | Krogedal et al. |
| 2010/0025349 A1 | 2/2010 | Khoshnevis |
| 2010/0138185 A1 | 6/2010 | Kang |
| 2010/0143089 A1 | 6/2010 | Hvass |
| 2010/0152899 A1 | 6/2010 | Chang et al. |
| 2010/0274390 A1* | 10/2010 | Walser ............... B25J 9/1697 700/259 |
| 2010/0281822 A1 | 11/2010 | Murray |
| 2011/0043515 A1 | 2/2011 | Stathis |
| 2011/0066393 A1 | 3/2011 | Groll et al. |
| 2011/0153524 A1 | 6/2011 | Schnackel |
| 2011/0208347 A1 | 8/2011 | Otake et al. |
| 2012/0038074 A1 | 2/2012 | Khoshnevis |
| 2012/0099096 A1 | 4/2012 | Bridges et al. |
| 2012/0136524 A1 | 5/2012 | Everett et al. |
| 2012/0265391 A1 | 10/2012 | Letsky |
| 2012/0277898 A1 | 11/2012 | Kawai et al. |
| 2013/0028478 A1 | 1/2013 | St-pierre et al. |
| 2013/0068061 A1 | 3/2013 | Yoon |
| 2013/0103192 A1 | 4/2013 | Huettenholer |
| 2013/0104407 A1 | 5/2013 | Lee |
| 2013/0222816 A1 | 8/2013 | Briggs et al. |
| 2013/0250285 A1 | 9/2013 | Bridges et al. |
| 2013/0286196 A1 | 10/2013 | Atwell |
| 2013/0297046 A1 | 11/2013 | Hendron et al. |
| 2013/0310982 A1 | 11/2013 | Scheurer |
| 2014/0002608 A1 | 1/2014 | Atwell et al. |
| 2014/0067121 A1 | 3/2014 | Brooks et al. |
| 2014/0176677 A1 | 6/2014 | Valkenburg et al. |
| 2014/0192187 A1 | 7/2014 | Atwell et al. |
| 2014/0309960 A1 | 10/2014 | Vennegeerts et al. |
| 2014/0343727 A1 | 11/2014 | Calkins et al. |

(56) References Cited

U.S. PATENT DOCUMENTS

| | | | |
|---|---|---|---|
| 2014/0348388 A1* | 11/2014 | Metzler | G01C 15/00 382/103 |
| 2014/0366481 A1 | 12/2014 | Benson | |
| 2014/0376768 A1 | 12/2014 | Troy | |
| 2015/0082740 A1 | 3/2015 | Peters et al. | |
| 2015/0100066 A1 | 4/2015 | Kostrzewski et al. | |
| 2015/0134303 A1 | 5/2015 | Chang et al. | |
| 2015/0153720 A1 | 6/2015 | Pettersson et al. | |
| 2015/0158181 A1 | 6/2015 | Kawamura | |
| 2015/0165620 A1 | 6/2015 | Osaka | |
| 2015/0241203 A1 | 8/2015 | Jordil et al. | |
| 2015/0258694 A1 | 9/2015 | Hand et al. | |
| 2015/0276402 A1 | 10/2015 | Grsser et al. | |
| 2015/0280829 A1* | 10/2015 | Breuer | H04B 10/0795 398/118 |
| 2015/0293596 A1 | 10/2015 | Krausen et al. | |
| 2015/0309175 A1 | 10/2015 | Hinderling et al. | |
| 2015/0314890 A1 | 11/2015 | Desjardien et al. | |
| 2015/0352721 A1 | 12/2015 | Wicks et al. | |
| 2015/0355310 A1 | 12/2015 | Gong et al. | |
| 2015/0367509 A1 | 12/2015 | Georgeson | |
| 2015/0371082 A1 | 12/2015 | Csaszar et al. | |
| 2015/0377606 A1 | 12/2015 | Thielemans | |
| 2016/0005185 A1* | 1/2016 | Geissler | G06T 7/579 348/47 |
| 2016/0093099 A1* | 3/2016 | Bridges | G01S 17/88 348/50 |
| 2016/0153786 A1 | 6/2016 | Liu et al. | |
| 2016/0187130 A1 | 6/2016 | Metzler et al. | |
| 2016/0187470 A1 | 6/2016 | Becker et al. | |
| 2016/0223364 A1 | 8/2016 | Peters et al. | |
| 2016/0242744 A1 | 8/2016 | Mihailescu et al. | |
| 2016/0263767 A1 | 9/2016 | Williams | |
| 2016/0274237 A1 | 9/2016 | Stutz | |
| 2016/0282107 A1 | 9/2016 | Roland et al. | |
| 2016/0282110 A1 | 9/2016 | Vagman et al. | |
| 2016/0282179 A1 | 9/2016 | Nazemi et al. | |
| 2016/0288331 A1 | 10/2016 | Sivich et al. | |
| 2016/0313114 A1 | 10/2016 | Tohme et al. | |
| 2016/0318187 A1 | 11/2016 | Tani | |
| 2016/0327383 A1 | 11/2016 | Becker et al. | |
| 2016/0340873 A1 | 11/2016 | Eidenberger et al. | |
| 2016/0341041 A1 | 11/2016 | Puura et al. | |
| 2016/0349746 A1 | 12/2016 | Grau | |
| 2016/0363436 A1 | 12/2016 | Clark et al. | |
| 2016/0363659 A1 | 12/2016 | Mindell et al. | |
| 2016/0363663 A1 | 12/2016 | Mindell et al. | |
| 2016/0363664 A1 | 12/2016 | Mindell et al. | |
| 2016/0364869 A1 | 12/2016 | Siercks et al. | |
| 2016/0364874 A1 | 12/2016 | Tohme et al. | |
| 2017/0028550 A1 | 2/2017 | Terada | |
| 2017/0066157 A1 | 3/2017 | Peters et al. | |
| 2017/0067739 A1 | 3/2017 | Siercks et al. | |
| 2017/0071680 A1 | 3/2017 | Swarup | |
| 2017/0082436 A1 | 3/2017 | Siercks et al. | |
| 2017/0091922 A1 | 3/2017 | Siercks et al. | |
| 2017/0091923 A1 | 3/2017 | Siercks et al. | |
| 2017/0108528 A1 | 4/2017 | Atlas et al. | |
| 2017/0122733 A1* | 5/2017 | Brown | G06T 7/97 |
| 2017/0122736 A1 | 5/2017 | Dold et al. | |
| 2017/0166399 A1 | 6/2017 | Stubbs | |
| 2017/0173796 A1 | 6/2017 | Kim et al. | |
| 2017/0176572 A1 | 6/2017 | Charvat et al. | |
| 2017/0179570 A1 | 6/2017 | Charvat | |
| 2017/0179603 A1 | 6/2017 | Charvat et al. | |
| 2017/0191822 A1 | 7/2017 | Becker et al. | |
| 2017/0227355 A1 | 8/2017 | Pettersson et al. | |
| 2017/0236299 A1 | 8/2017 | Valkenburg et al. | |
| 2017/0254102 A1 | 9/2017 | Peters et al. | |
| 2017/0269203 A1 | 9/2017 | Trishaun | |
| 2017/0291805 A1 | 10/2017 | Hao et al. | |
| 2017/0307757 A1 | 10/2017 | Hinderling et al. | |
| 2017/0314909 A1 | 11/2017 | Dang | |
| 2017/0314918 A1* | 11/2017 | Shah | H04N 5/2256 |
| 2017/0333137 A1 | 11/2017 | Roessler | |
| 2017/0343336 A1 | 11/2017 | Lettau | |
| 2017/0371342 A1 | 12/2017 | Hashimoto | |
| 2018/0001479 A1 | 1/2018 | Li et al. | |
| 2018/0003493 A1 | 1/2018 | Bernhard et al. | |
| 2018/0017384 A1 | 1/2018 | Siercks et al. | |
| 2018/0023935 A1 | 1/2018 | Atwell et al. | |
| 2018/0038684 A1 | 2/2018 | Fröhlich et al. | |
| 2018/0046096 A1 | 2/2018 | Shibazaki | |
| 2018/0052233 A1 | 2/2018 | Frank et al. | |
| 2018/0108178 A1 | 4/2018 | Murugappan et al. | |
| 2018/0121571 A1 | 5/2018 | Tiwari et al. | |
| 2018/0149469 A1 | 5/2018 | Becker et al. | |
| 2018/0156601 A1 | 6/2018 | Pontai | |
| 2018/0170719 A1 | 6/2018 | Tasch et al. | |
| 2018/0180416 A1 | 6/2018 | Edelman et al. | |
| 2018/0202796 A1 | 7/2018 | Ziegenbein | |
| 2018/0209156 A1 | 7/2018 | Pettersson | |
| 2018/0239010 A1 | 8/2018 | Mindell et al. | |
| 2018/0300433 A1 | 10/2018 | Maxam et al. | |
| 2019/0026401 A1 | 1/2019 | Benjamin et al. | |
| 2019/0032348 A1 | 1/2019 | Parkes | |
| 2019/0184555 A1 | 6/2019 | Linnell et al. | |
| 2019/0224846 A1 | 7/2019 | Pivac et al. | |
| 2019/0251210 A1 | 8/2019 | Pivac et al. | |
| 2019/0316369 A1 | 10/2019 | Pivac et al. | |
| 2019/0352146 A1 | 11/2019 | Pivac et al. | |
| 2020/0206923 A1 | 7/2020 | Pivac et al. | |
| 2020/0206924 A1 | 7/2020 | Pivac et al. | |
| 2020/0215688 A1 | 7/2020 | Pivac et al. | |
| 2020/0215692 A1 | 7/2020 | Pivac et al. | |
| 2020/0215693 A1 | 7/2020 | Pivac et al. | |
| 2020/0324981 A1 | 10/2020 | Pivac et al. | |
| 2021/0016437 A1 | 1/2021 | Pivac et al. | |
| 2021/0016438 A1 | 1/2021 | Pivac et al. | |
| 2021/0080582 A1 | 3/2021 | Pivac et al. | |
| 2021/0291362 A1 | 9/2021 | Pivac et al. | |
| 2021/0370509 A1 | 12/2021 | Pivac et al. | |
| 2021/0379775 A1 | 12/2021 | Pivac et al. | |

FOREIGN PATENT DOCUMENTS

| | | |
|---|---|---|
| CN | 2730976 Y | 10/2005 |
| CN | 2902981 Y | 5/2007 |
| CN | 2923903 Y | 7/2007 |
| CN | 101100903 A | 1/2008 |
| CN | 201184054 Y | 1/2009 |
| CN | 101360873 B | 2/2009 |
| CN | 101476883 A | 7/2009 |
| CN | 100557169 C | 11/2009 |
| CN | 101694130 A | 4/2010 |
| CN | 201972413 U | 9/2011 |
| CN | 102359282 A | 2/2012 |
| CN | 202248944 U | 5/2012 |
| CN | 202292752 U | 7/2012 |
| CN | 102995911 A | 3/2013 |
| CN | 202925913 U | 5/2013 |
| CN | 103363902 A | 10/2013 |
| CN | 103698769 A | 4/2014 |
| CN | 203701626 U | 7/2014 |
| CN | 104141391 B2 | 11/2014 |
| CN | 104153591 A | 11/2014 |
| CN | 104493810 A | 4/2015 |
| CN | 204295678 U | 4/2015 |
| CN | 104612411 A | 5/2015 |
| CN | 204311767 U | 5/2015 |
| CN | 103774859 B | 11/2015 |
| CN | 103753586 B | 12/2015 |
| CN | 105113373 A | 12/2015 |
| CN | 105178616 A | 12/2015 |
| CN | 105257008 B | 1/2016 |
| CN | 105544998 A | 5/2016 |
| CN | 104806028 B | 11/2016 |
| CN | 205668271 U | 11/2016 |
| CN | 205840368 U | 12/2016 |
| CN | 205990775 U | 3/2017 |
| CN | 206185879 U | 5/2017 |
| CN | 206189878 U | 5/2017 |
| CN | 105089274 B | 6/2017 |
| CN | 105064699 B | 7/2017 |

(56) References Cited

FOREIGN PATENT DOCUMENTS

| | | |
|---|---|---|
| CN | 107217859 A | 9/2017 |
| CN | 107237483 A | 10/2017 |
| CN | 107357294 A | 11/2017 |
| CN | 107605167 A | 1/2018 |
| CN | 206844687 U | 1/2018 |
| CN | 107654077 A | 2/2018 |
| CN | 107675891 A | 2/2018 |
| CN | 107740591 A | 2/2018 |
| CN | 106088632 B | 3/2018 |
| CN | 107762165 A | 3/2018 |
| CN | 207063553 U | 3/2018 |
| CN | 106088631 B | 5/2018 |
| CN | 107975245 A | 5/2018 |
| CN | 108061551 A | 5/2018 |
| CN | 108222527 A | 6/2018 |
| CN | 108301628 A | 7/2018 |
| CN | 108331362 A | 7/2018 |
| CN | 106150109 B | 8/2018 |
| CN | 108457479 A | 8/2018 |
| CN | 108708560 A | 10/2018 |
| CN | 208023979 U | 10/2018 |
| CN | 106881711 A | 4/2019 |
| CN | 107083845 A | 6/2019 |
| CN | 108016585 B | 7/2019 |
| DE | 3430915 C2 | 3/1986 |
| DE | 4038260 C2 | 6/1991 |
| DE | 4207384 A1 | 9/1993 |
| DE | 19509809 A1 | 10/1995 |
| DE | 4417928 A1 | 11/1995 |
| DE | 29601535 U1 | 5/1997 |
| DE | 19600006 A1 | 7/1997 |
| DE | 19603234 C2 | 9/1997 |
| DE | 19743717 C2 | 4/1999 |
| DE | 19849720 A1 | 5/2000 |
| DE | 10230021 C1 | 7/2003 |
| DE | 102006030130 B3 | 9/2007 |
| DE | 102009018070 A1 | 10/2010 |
| DE | 102009042014 A1 | 3/2011 |
| DE | 202012100646 U1 | 6/2013 |
| DE | 102013019869 A1 | 5/2015 |
| EP | 190076 A1 | 8/1986 |
| EP | 370682 A2 | 5/1990 |
| EP | 456020 A1 | 1/1995 |
| EP | 493020 B1 | 4/1995 |
| EP | 495525 B1 | 4/1995 |
| EP | 836664 B1 | 1/1999 |
| EP | 674069 B1 | 12/1999 |
| EP | 1375083 A2 | 1/2004 |
| EP | 1918478 A2 | 5/2008 |
| EP | 2112291 A1 | 10/2009 |
| EP | 2219528 A1 | 8/2010 |
| EP | 2249997 A1 | 11/2010 |
| EP | 2353801 A2 | 8/2011 |
| EP | 2199719 B1 | 10/2014 |
| EP | 3084719 A1 | 10/2016 |
| ES | 2296556 A1 | 4/2008 |
| FR | 2230825 A1 | 12/1974 |
| FR | 2524522 A1 | 10/1983 |
| GB | 119331 A | 10/1918 |
| GB | 2198105 A | 5/1923 |
| GB | 673472 A | 6/1952 |
| GB | 682010 A | 11/1952 |
| GB | 839253 A | 6/1960 |
| GB | 1067604 A | 5/1967 |
| GB | 1465068 A | 2/1977 |
| GB | 125079 | 12/2001 |
| GB | 2422400 A | 7/2006 |
| JP | 64006719 A | 1/1989 |
| JP | H07101509 A | 11/1999 |
| JP | 2005283600 A | 10/2005 |
| JP | 4294990 B2 | 4/2009 |
| JP | 2009521630 A | 6/2009 |
| JP | 5508895 B2 | 3/2014 |
| LU | 87054 A1 | 6/1989 |
| LU | 87381 A1 | 6/1990 |
| LU | 88144 A1 | 4/1994 |
| RU | 85392 U1 | 8/2009 |
| WO | 9702397 A1 | 1/1997 |
| WO | 2001076830 A1 | 10/2001 |
| WO | 2004020760 A1 | 3/2004 |
| WO | 2004083540 A3 | 2/2005 |
| WO | 2005014240 A1 | 2/2005 |
| WO | 2005017550 A2 | 2/2005 |
| WO | 2005070657 A1 | 8/2005 |
| WO | 2004011734 A1 | 11/2005 |
| WO | 2006111827 A1 | 10/2006 |
| WO | 2007076581 A1 | 7/2007 |
| WO | 2008110559 A2 | 9/2008 |
| WO | 2008124713 A2 | 10/2008 |
| WO | 2009026641 A1 | 3/2009 |
| WO | 2009026642 A1 | 3/2009 |
| WO | 2010020457 A1 | 2/2010 |
| WO | 2011077006 A2 | 6/2011 |
| WO | 2013088154 A1 | 6/2013 |
| WO | 2013134559 A1 | 9/2013 |
| WO | 2018009978 A1 | 1/2018 |
| WO | 2018009980 A1 | 1/2018 |
| WO | 2018009981 A1 | 1/2018 |
| WO | 2018009985 A1 | 1/2018 |
| WO | 2018009986 A1 | 1/2018 |
| WO | 2018052469 A3 | 4/2018 |
| WO | 201899323 A1 | 6/2018 |
| WO | 2019006511 A1 | 1/2019 |
| WO | 2019014701 A1 | 1/2019 |
| WO | 2019014702 A1 | 1/2019 |
| WO | 2019014705 A1 | 1/2019 |
| WO | 2019014706 A1 | 1/2019 |
| WO | 2019014707 A1 | 1/2019 |
| WO | 2019033165 A1 | 2/2019 |
| WO | 2019033166 A1 | 2/2019 |
| WO | 2019033170 A1 | 2/2019 |
| WO | 2019068128 A1 | 4/2019 |
| WO | 2019071313 A1 | 4/2019 |

OTHER PUBLICATIONS

Dorfler, K. et al.: "Mobile Robotic Brickwork, Automation of a Discrete Robotic Fabrication Process Using an Autonomous Mobile Robot Robotic Fabrication in Architecture", Art and Design 2016, Feb. 4, 2016 (Feb. 4, 2016), pp. 204-217, XP055567451.

Egerstedt, M. et al.: "Control of Mobile Platforms using a Virtual Vehicle Approach", IEEE Transactions On Automatic Control, vol. 46, No. 11, Nov. 2001 (Nov. 1, 2001), XP055567515.

Fastbrick Robotics, Fastbrick Robotics: Hadrian 105 First Look Revealed, Nov. 16, 2015 (Nov. 16, 2015), XP054978174, Retrieved from the Internet <URL:https://www.youtube.com/watch?v=7Zw7qHxMtrY> [retrieved on Nov. 16, 2015].

Fastbrick Robotics: Hadrian 105 Demonstrative Model Animation, Jun. 29, 2015 (Jun. 29, 2015), XP054979424, Retrieved from the Internet <URL:https://www.youtube.com/watch?v=Rebqcsb61gY> [retrieved on Mar. 7, 2018].

Fastbrick Robotics: Hadrian 105 Time Lapse, Fastbrick Robotics Time Lapse, May 22, 2016 (May 22, 2016), XP054978173, Retrieved from the Internet <URL:https://www.youtube.com/watch?v=4Ycr080NcfY> [retrieved on May 22, 2016].

Feng, C. et al.: "Vision Guided Autonomous Robotic Assembly and as-built Scanning on Unstructured Construction Sites", Automation in Construction, vol. 59, Nov. 2015 (Nov. 1, 2015), pp. 128-138, XP055567454.

Gao, X. et al.: "Complete Solution Classification for the Perspective-Three-Point Problem", IEEE Transactions On Pattern Analysis and Machine Intelligence, vol. 25, No. 8, Aug. 2003 (Aug. 1, 2003), pp. 930-943, XP011099374.

Giftthaler, M. et al., "Efficient Kinematic Planning for Mobile Manipulators with Non-holonomic Constraints Using Optimal Control", 2017 IEEE International Conference on Robotics and Automation (ICRA), Singapore, May 29-Jun. 3, 2017.

Heintze, H., "Design and Control of a Hydraulically Actuated Industrial Brick Laying Robot," 264 pages.

(56) References Cited

OTHER PUBLICATIONS

Heintze, J. et al., "Controlled hydraulics for a direct drive brick laying robot," Automation in Construction 5 (1996), pp. 23-29.

Helm, V. et al.: "Mobile Robotic Fabrication on Construction Sites: dimRob", IEEE /RSJ International Conference On Intelligent Robots and Systems, Oct. 7, 2012 (Oct. 7, 2012), Vilamoura, Portugal, pp. 4335-4341, XP032287463.

http://www.new-technologies.org/ECT/Other/brickrob.htm. "Emerging Construction Technologies." Dec. 1, 2006.

Huang, S. et al., "Applying High-Speed Vision Sensing to an Industrial Robot for High-Performance Position Regulation under Uncertainties," Sensors, 2016, 16, 1195, 15 pages.

International Preliminary Report on Patentability for International Application No. PCT/AU2017/050731; dated Jan. 15, 2019; 5 pages.

International Preliminary Report on Patentability for International Application No. PCT/AU2017/050738; dated Jan. 15, 2019; 13 pages.

International Preliminary Report on Patentability for International Application No. PCT/AU2017/050739; dated Jan. 15, 2019; 6 pages.

International Preliminary Report on Patentability for International Application No. PCT/AU2018/050733; dated Jan. 21, 2020; 6 pages.

International Preliminary Report on Patentability for International Application No. PCT/AU2018/050734; dated Jan. 21, 2020; 9 pages.

International Preliminary Report on Patentability for International Application No. PCT/AU2018/050737; dated Jan. 21, 2020; 6 pages.

International Preliminary Report on Patentability for International Application No. PCT/AU2018/050739; dated Jan. 21, 2020; 6 pages.

International Preliminary Report on Patentability for International Application No. PCT/AU2018/050740; dated Jan. 21, 2020; 6 pages.

International Search Report and Written Opinion for International Application No. PCT/AU2017/050730; dated Aug. 23, 2017; 17 pages.

International Search Report and Written Opinion for International Application No. PCT/AU2017/050731; dated Aug. 31, 2017; 8 pages.

International Search Report and Written Opinion for International Application No. PCT/AU2017/050738; dated Oct. 17, 2017; 19 pages.

International Search Report and Written Opinion for International Application No. PCT/AU2017/050739; dated Sep. 28, 2017; 9 pages.

Kazemi, M. et al.: "Path Planning for Image-based Control of Wheeled Mobile Manipulators", 2012 IEEE/RSJ International Conference On Intelligent Robots and Systems, Oct. 7, 2012 (Oct. 7, 2012), Vilamoura, Portugal, XP055567470.

Kleinkes, M. et al.: "Laser Tracker and 6DoF measurement strategies in industrial robot applications", CMSC 2011: Coordinate Metrology System Conference, Jul. 25, 2011 (Jul. 25, 2011), XP055456272.

Koren et al.: "End-effector guidance of robot arms", CIRP Annals—Manufacturing Technology, vol. 36, No. 1, 1987, pp. 289-292, XP055456270.

Kwon, S. et al., "On the Coarse/Fine Dual-Stage Manipulators with Robust Perturbation Compensator," IEEE, May 21-26, 2001, pp. 121-126.

Kyle in CMSC: Charlotte-Concord, Jul. 21-25, 2008.

Latteur, et al., "Drone-Based Additive Manufacturing of Architectural Structures," IASS Symposium 2015, Amsterdam, The Netherlands; Aug. 17-20, 2015; 12 pages.

Lippiello, V. et al.: "Position-Based Visual Servoing in Industrial Multirobot Cells Using a Hybrid Camera Configuration", IEEE Transactions On Robotics, vol. 23, No. 1, Feb. 2007 (Feb. 1, 2007), XP011163518.

Liu, Z. et al.: "EtherCAT Based Robot Modular Joint Controller", Proceeding of The 2015 IEEE International Conference On Information and Automation, Aug. 2015 (Aug. 1, 2015), Lijiang, China, pp. 1708-1713, XP033222650.

Notice of Acceptance of Patent Application received for priority Australian Patent Application No. 2017294796, dated May 15, 2019 (158 pages).

Pless, R .: "Using Many Cameras as One", IEEE Computer Society Conference On Computer Vision and Pattern Recognition, Jun. 18, 2003 (Jun. 18, 2003), Madison , WI, USA, pp. 1-7, XP055564465.

Posada et al.: "High accurate robotic drilling with external sensor and compliance model-based compensation", Robotics and Automation (ICRA), 2016 IEEE International Conference, May 16, 2016 (May 16, 2016), pp. 3901-3907, XP032908649.

Pritschow, G. et al., "A Mobile Robot for On-Site Construction of Masonry," Inst. Of Control Tech. for Machine Tools and Manuf. Units, pp. 1701-1707.

Pritschow, G. et al., "Application Specific Realisation of a Mobile Robot for On-Site Construction of Masonry," Automation and Robotics in Construction XI, 1994, pp. 95-102.

Pritschow, G. et al., "Configurable Control System of a Mobile Robot for ON-Site Construction of Masonry," Inst. Of Control Technology for Machine Tools and Manuf. Units, pp. 85-92.

Pritschow, G. et al., "Technological aspects in the development of a mobile bricklaying robot," Automation in Construction 5 (1996), pp. 3-13.

Riegl Laser Measurement Systems. "Long Range & High Accuracy 3D Terrestrial Laser Scanner System—LMS-Z420i." pp. 1-4.

Salcudean, S. et al., "On the Control of Redundant Coarse-Fine Manipulators," IEEE, pp. 1834-1840.

Sandy, T. et al.: "Autonomous Repositioning and Localization of an In Situ Fabricator", 2016 IEEE International Conference On Robotics and Automation (ICRA), May 16, 2016 (May 16, 2016), pp. 2852-2858, XP055567467.

Skibniewski, M.J., "Current Status of Construction Automation and Robotics in the United States of America," The 9th International Symposium on Automation and Robotics in Construction, Jun. 3-5, 1992, 8 pages.

Trimble ATS. "Advanced Tracking Sensor (ATS) with target recognition capability for stakeless machine control survey applications." pp. 1-4.

Vincze, M. et al., "A Laser Tracking System to Measure Position and Orientation of Robot End Effectors Under Motion," The International Journal of Robotics Research, vol. 13, No. 4, Aug. 1994, pp. 305-314.

Warszawski, A. et al., "Implementation of Robotics in Building: Current Status and Future Prospects," Journal of Construction Engineering and Management, Jan./Feb. 1998, 124(1), pp. 31-41.

Willmann, J. et al.: "Robotic Timber Construction—Expanding Additive Fabrication to New Dimensions", Automation in Construction, vol. 61, 2016, pp. 16-23, XP029310896.

Xu, H. et al.: "Uncalibrated Visual Servoing of Mobile Manipulators with an Eye-to-hand Camera", Proceedings of The 2016 IEEE International Conference On Robotics and Biomimetics, Dec. 3, 2016 (Dec. 3, 2016), Qingdao, China, pp. 2145-2150, XP033071767.

Yu, S.N. et al., "Feasibility verification of brick-laying robot using manipulation trajectory and the laying pattern optimization," Dept. of Mech. Eng., Automation in Construction (2009), pp. 644-655.

Partial Supplementary European Search Report dated Apr. 14, 2020 in European Patent Application No. 17826696.1, 10 pages.

Zaki, T., "Parametric modeling of Blackwall assemblies for automated generation of shop drawings and detailed estimates using BIM", Master's Thesis, May 23, 2016, pp. 1-151.

Boston Dynamics: "Introducing Spot (previously SpotMini)", Jun. 28, 2016, YouTube video, 1 page (screenshot of video); video retrieved at <https://www.youtube.com/watch?v=tf7IEVTDjng>.

Examination Report dated Apr. 18, 2021 in GCC Patent Application No. 2018-35644, 5 pages.

Examination Report dated Apr. 30, 2021 in GCC Patent Application No. 2018-35643, 3 pages.

Examination Report dated Jun. 29, 2021 for India Patent Application No. 201927004006, 6 pages.

(56) References Cited

OTHER PUBLICATIONS

Examination Report dated Sep. 30, 2021 for Australian Patent Application No. 2017295316, 3 pages.
Extended European Search Report dated Jun. 4, 2021 for European Patent Application No. 18865644.1, 7 pages.
Extended European Search Report dated Mar. 16, 2021 for European Patent Application No. 18834565.6, 19 pages.
Extended European Search Report dated Mar. 17, 2021 for European Patent Application No. 18835861.8, 12 pages.
Extended European Search Report dated Mar. 18, 2021 for European Patent Application No. 18834673.8, 14 pages.
Extended European Search Report dated Mar. 18, 2021 for European Patent Application No. 18834893.2, 12 pages.
Extended European Search Report dated Mar. 18, 2021 for European Patent Application No. 18835737.0, 10 pages.
Extended European Search Report dated Mar. 30, 2021 for European Patent Application No. 18845794.9, 13 pages.
Extended European Search Report dated Mar. 5, 2021 for European Patent Application No. 18828425.1, 7 pages.
Fastbrick Robotics: Hadrian X Digital Construction System, published on Sep. 21, 2016 <URL: https://www.youtube.com/watch?v=5bW1vuCgEaA >.
Gander H et al.: "Application of a floating point digital signal processor to a dynamic robot measurement system", Instrumentation and Measurement Technology Conference, 1994. IMTC/94. Conference Proceedings. 10$^{th}$ Anniversary. Advanced Technologies in I & M 1994 IEEE Hamamatsu, Japan May 10-12, 1994, New York, NY, USA, IEEE, May 10, 1994 (May 10, 1994), pp. 372-375, XP010121924, DOI: 10.1109/IMTC.1994.352046, ISBN: 978-0-7803-1880-9, *whole document*.
Garrido, S. et al., "FM2: A real-time fast marching sensor based motion planner", Advanced Intelligent Mechatronics, 2007 IEEE/ASME International Conference On, IEEE, PI, Sep. 1, 2007 (Sep. 1, 2007), pp. 1-6.
International Search Report and Written Opinion for International Patent Application No. PCT/AU19/50742; dated Sep. 23, 2019; 5 pages.
International Search Report and Written Opinion for International Patent Application No. PCT/AU19/50743; dated Oct. 1, 2019; 10 pages.
International Search Report and Written Opinion for International Patent Application No. PCT/AU20/50367; dated Jun. 29, 2020; 15 pages.
International Search Report and Written Opinion for International Patent Application No. PCT/AU20/50368; dated Jun. 25, 2020; 11 pages.
Kleinigger, M. et al.: "Application of 6-DOF sensing for robotic disturbance compensation", Automation Science and Engineering (CASE), 2010 IEEE Conference On, IEEE, Piscataway, NJ, USA, Aug. 21, 2010 (Aug. 21, 2010, pp. 344-349, XP031762876, ISBN: 978-1-4244-5477-1, *abstract*, *sections 1 to 3*.
Mercedes-Benz: "Mercedes-Benz "Chicken" Magic Body Control TV commercial", YouTube, Sep. 23, 2013, 1 page. Retrieved from the internet: <https://www.youtube.com/watch?v+nLwML2PagbY>.
Office Action dated Apr. 21, 2021 in Japanese Patent Application No. 2019-523148, 4 pages.
Office Action dated Aug. 20, 2021 for Japanese Patent Application No. 2019-523147, 3 pages.
Office Action dated Jul. 5, 2021 for Japanese Patent Application No. 2019-523145, 4 pages.
Office Action dated May 24, 2021 for Chinese Patent Application No. 201880067520.0, 8 pages.
Office Action dated Sep. 3, 2021 for Chinese Patent Application No. 201780056460.8, 9 pages.
Siciliano, B. et al., "Robotics—chapters 2-4" Robotics, Dec. 31, 2009 (Dec. 31, 2009), Springer London, London, pp. 39-189.
European search report dated Mar. 28, 2022 in European Patent Application No. 19837417.5, 10 pages.
European search report dated Mar. 7, 2022 in European Patent Application No. 19838430.7, 9 pages.
Examination report dated Feb. 24, 2022 in Australian Patent Application No. 2017295317, 3 pages.
Examination report dated Dec. 26, 2021 in Saudi Arabian Patent Application No. 519400899, 8 pages.
Examination report dated Feb. 9, 2022 in Chinese Patent Application No. 201880067520.0, with English translation, 14 pages.

\* cited by examiner

REAL TIME POSITION AND ORIENTATION TRACKER

PRIORITY DOCUMENTS

The present application claims priority from Australian Provisional Application No. 2017902623 titled "REAL TIME POSITION AND ORIENTATION TRACKER" and filed on 5 Jul. 2017, the content of which is hereby incorporated by reference in its entirety.

BACKGROUND OF THE INVENTION

The present invention relates to a tracking system for tracking the position and/or orientation of an object in an environment.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

To accurately control the end effector position of industrial robots or large construction robots, it is necessary to measure the position and orientation of the end effector, or a part of the robot close to the end effector. To achieve dynamic stability and accurate control during movement of the robot, it is necessary to measure the position and orientation at a high data rate and in real time. Delays in the feedback loop of a control system lead to following error and reduced bandwidth and phase margin, all of which are undesirable. Delay can also introduce self-excitation or resonance in servo-controlled systems.

For conventional sized robots with a reach of up to 3 m and when the end effector maintains line of sight to a laser tracker, the currently available laser tracker and Optical CMM solutions provide accurate data at adequate frequency to correct the end effector position for tasks such as drilling.

For large construction robots such as that described in the inventor's international patent application PCT/AU2007/000001, which has a reach of 30 m, and where due to line of sight constraints, the distance between the target and the end effector can be 2 m, the static position measurement accuracy of about 0.3 mm and orientation accuracy of 0.01 degrees results in an end effector accuracy of only 0.7 mm which is only just adequate. With an orientation accuracy of 0.1 mm, the end effector accuracy is reduced to +/−4 mm which means that adjacent bricks could have a mis-match of 8 mm between them, although the inventor has found that typically the bricks are within 4 mm of each other and within 2 mm of absolute position. Furthermore, the position measurements have error components that consist of long term drift, high frequency white noise and low frequency noise (that may be due to vibration of structural parts of the measurement system or tuning of servo components in the measurement system). Filtering the measurements to reduce the noise introduces a time delay. Even with an optimised system, the introduction of error noise and delay reduces the dynamic performance of the coarse-fine position compensation system and can introduce resonance to the system.

Six degree of freedom laser trackers such as the Leica AT960XR with Tmac or the API Omnitrac with Active Target or Smart Trac Sensor (STS) are known. The Leica AT960XR laser tracking system can provide position coordinates accurate to approximately +/−15 um at a rate of 1000 positions per second. The AT960XR with Tmac probe can also provide orientation to an accuracy of 0.01 degrees and this orientation is measured at 100 Hz and either interpolated to 1000 Hz, which introduces a 10 ms time delay or extrapolated to 1000 Hz which introduces an extrapolation error which depends on the motion of the Tmac. With the Tmac, the range is limited to 30 m. The cost of a system was approximately AUD 400,000.00 in 2016.

The API Omnitrac and STS provides both position and orientation data at 300 Hz. The orientation data has an accuracy of less than 0.1 degree. API may, in the future, improve the orientation accuracy of their equipment to 0.01 degree but this has not happened yet.

Laser trackers rely on measuring the time of flight of a light beam and/or laser interferometry for distance measurement and therefore depend on accurately knowing the temperature and density of the air because this affects the speed of light. For this reason the laser trackers include a weather station to measure temperature and humidity and barometric pressure.

GPS (Global Positioning System) with RTK (Real Time Kinematics) is known to provide horizontal position accuracy at approximately cm resolution at rates less than 20 Hz. The height accuracy of GPS with RTK is worse than this.

The Nikon iGPS can provide position accuracy of 0.3 mm and full 6 DOF (six degrees of freedom) position measurement, however the measurement rate is limited to approximately 20 Hz.

The Nikon K Series optical CMM (Coordinate Measuring Machine) uses three linear CCD cameras to localize infrared LEDs incorporated into the carbon fiber housing of a touch probe. The measuring range is limited to 6 m distance and provides a volumetric accuracy of 60 to 90 um. Orientation accuracy depends on the size of the probe. The measurements can be at up to 1000 Hz.

Laser trackers have moving components and require precise alignment and calibration on a regular basis. They are relatively delicate instruments. They require particular care when being used on construction sites and when being transported. A laser tracker unit must be set up on firm ground when used on a construction site.

The realities of a construction site using large robots require a robust position and orientation tracking device that can measure 6 degrees of freedom and provide velocity data as well, over a large volume, and that is easy to set up and transport. An order of magnitude reduction in the price of the system, relative to currently available systems would be highly beneficial. A target price in the tens of thousands of dollars range rather than hundreds of thousands of dollars range would be desirable.

It is against this background, and the problems and difficulties associated therewith, that the present invention has been developed.

SUMMARY OF THE PRESENT INVENTION

In one broad form, the present invention seeks to provide a tracking system for tracking the position and/or orientation of an object in an environment, the tracking system including:
 a) at least one camera mounted to the object;
 b) a plurality of spaced apart targets, at least some of said targets viewable by the at least one camera; and, c) one or more electronic processing devices configured to:
   i) determine target position data indicative of the relative spatial position of the targets;
   ii) receive image data indicative of an image from the at least one camera, said image including at least some of the targets;
   iii) process the image data to:
      (1) identify one or more targets in the image;
      (2) determine pixel array coordinates corresponding to the position of the one or more targets in the image; and,
   iv) use the processed image data to determine the position and orientation of the object by triangulation.

In one embodiment, the system includes a body attachable to the object, the body having a camera array including a plurality of spaced apart cameras each having a field of view with a central axis, with the central axis of adjacent spaced apart cameras being divergently spaced by a predetermined fixed angle.

In one embodiment, the fields of view of adjacent cameras are at least partially overlapping so that at least some cameras can each view one or more common targets.

In one embodiment, the plurality of cameras are spaced radially apart with their central axes lying in a common plane.

In one embodiment, the number of cameras in the camera array is selected from: 2, 3, 4, 5, 6, 7, 8, 9, 10, 11, 12, 13, 14, 15, 16, 17, 18, 19 and 20.

In one embodiment, the body is spherical and the camera array includes a plurality of cameras arranged about the spherical body with their central axes spaced at predetermined angles.

In one embodiment, a target defines at least one of:
a) an individual point target; and,
b) a target array comprising a plurality of point targets.

In one embodiment, the plurality of spaced apart targets are at least one of:
a) user generated; and,
b) computer generated.

In one embodiment, user generated targets are targets that are manually set up in the environment at predetermined locations by the user.

In one embodiment, the plurality of spaced apart targets include a plurality of target arrays of predetermined configuration, each of the target arrays having at least three targets spaced apart from each other by predetermined distances.

In one embodiment, a target array has a unique spaced apart configuration of targets, compared with any other target array.

In one embodiment, a target array includes at least one of:
a) an upright mast on which the at least three targets are disposed in a spaced apart and colinear arrangement;
b) a cross having upright and horizontal members each supporting a plurality of targets disposed in a spaced apart and colinear arrangement.

In one embodiment, the targets are arranged on each mast or cross spaced apart from each other according to unique predetermined target spacings for each mast or cross.

In one embodiment, the plurality of spaced apart targets include at least two target arrays manually locatable in predetermined spaced apart positions, viewable by the camera array when the object is located in an operating position in which its position and orientation is to be determined.

In one embodiment, the plurality of spaced apart targets are arranged in configurations selected from one or both of:
a) spaced apart along a straight line; and,
b) spaced apart in two intersecting lines.

In one embodiment, the or each line of targets is horizontally disposed.

In one embodiment, the targets are lights that are time synchronised to switch on and off at defined intervals to thereby allow a camera imaging a target to identify the target that is imaged.

In one embodiment, the body includes a surveying target viewable by a surveying instrument to determine the position of the body relative to the surveying instrument.

In one embodiment, the surveying instrument is selected from one of a theodolite such as a total station, or a laser tracker.

In one embodiment, the camera array is used to determine the orientation of the body.

In one embodiment, the at least one camera images the environment and the one or more electronic processing devices are further configured to:
a) receive the image data from the at least one camera; and,
b) analyse the image data to:
   i) identify a number of potential targets using image recognition algorithms;
   ii) select a plurality of the potential targets for use by the tracking system based at least in part on a set of target rules; and,
   iii) determine a position and orientation of the selected targets in the environment.

In one embodiment, the targets are fixed reference points in environment.

In one embodiment, the one or more electronic processing devices create a map of the environment including the selected targets.

In one embodiment, the map is created during initial setup of the object in the environment.

In one embodiment, a user can at least one of:
a) select the targets based on a number of potential targets identified by the one or more electronic processing devices; and,
b) override, confirm or delete targets selected by the one or more electronic processing devices.

In one embodiment, as the object moves and the at least one camera images the environment, the one or more electronic processing devices are configured to analyse image data to identify at least some of the selected targets for use in position and/or orientation determination.

In one embodiment, the system includes at least one initial reference target at a known location in the environment and wherein the one or more electronic processing devices are configured to:
a) determine the position and/or orientation of the object by imaging the at least one initial reference target; and,
b) determine the position and/or orientation of one or more random targets at unknown locations in the environment using the determined position and/or orientation of the object.

In one embodiment, the initial reference target is removed after a predefined number of random targets have been positioned in the environment by the one or more electronic processing devices.

In one embodiment, the system establishes new targets as the object moves through the environment.

In one embodiment, a target position in an image is determined by the one or more electronic processing devices analysing pixel target saturation, to determine pixel array coordinates for the centre of the target.

In one embodiment, the targets use colour to distinguish individual targets in a target array.

In one embodiment, triangulation is performed on the processed image data to determine at least the distance between a target and a camera.

In one embodiment, the pixel array coordinates corresponding to the position of a target are determined to sub-pixel resolution.

In one embodiment, the pixel array coordinates corresponding to the position of the target in the image are indicative of angular data representing a target heading angle and an elevation angle.

In one embodiment, previously stored images are analysed by the one or more electronic processing devices to determine a rate of change of the target heading angle and target elevation angle for use in determining the velocity of the object.

In one embodiment, the system further includes a look-up table of calibration data stored in memory of the one or more electronic processing devices, the calibration data including pixel position values and range correlated to camera focusing data, so that observed target pixel array coordinates have camera focusing data applied to thereby apply range correction in the determination of distance to targets.

In one embodiment, the system includes a camera array including two or more cameras mounted around the object in a distributed arrangement.

In one embodiment, the at least one camera is a digital camera having one of:
a) a charge-coupled device (CCD) image sensor; and,
b) a complementary metal oxide semiconductor (CMOS) image sensor.

In one embodiment, the or each camera is connected to a dedicated image processor for processing the image data from the camera.

In one embodiment, the image processor is one of:
a) a Field Programmable Gate Array (FPGA);
b) an Application Specific Integrated Circuit (ASIC);
c) a microprocessor; and,
d) a microcontroller.

In one embodiment, the image processor of each camera sends data via a data bus to a dedicated position and velocity processor that determines the position, orientation and velocity of the object.

In one embodiment, the position and velocity processor is one of:
a) a Field Programmable Gate Array (FPGA);
b) an Application Specific Integrated Circuit (ASIC);
c) a microprocessor; and,
d) a microcontroller.

In one embodiment, the position and velocity processor outputs data to a control and logging system via a fieldbus link.

In one embodiment, the system includes at least two cameras viewing at least two targets so that the triangulation is well conditioned to increase positional accuracy.

In one embodiment, the system includes an array of cameras and targets so that as position and orientation of the object changes, the triangulation remains well conditioned.

In another broad form, an aspect of the present invention seeks to provide a method of tracking the position and/or orientation of an object in an environment, the method including:
a) mounting at least one camera to the object so that at least some of a plurality of targets are viewable by the at least one camera when the object is located in an operating position in which its position and/or orientation is to be determined; and,
b) the method further including in one or more electronic processing devices:
i) determining target position data indicative of the relative spatial position of the targets;
ii) receiving image data indicative of an image from the at least one camera, said image including at least some of the targets; and,
iii) processing the image data to:
(1) identify one or more targets in the image;
(2) determine pixel array coordinates corresponding to a position of the one or more targets in the image; and,
iv) using the processed image data to determine the position and/or orientation of the object by triangulation.

In one embodiment, the method includes mounting a camera array to the object, the camera array including at least two cameras that are at least one of:
a) housed in a body attached to the object; and,
b) distributed around the object.

In another broad form, there is provided a tracking system for tracking the position and orientation of an object in space, the tracking system having a body attachable to said object, said body having a camera array comprising at least two spaced apart cameras each having a field of view with a central axis, with the central axis of adjacent said spaced apart cameras being divergently spaced by a predetermined fixed angle, and adjacent said spaced apart cameras preferably having at least intersecting fields of view, said tracking system including a plurality of spaced apart targets; said body being located to enable at least one of said cameras to view some of said targets, said tracking system including a processor to receive input data comprising the relative spatial positions of said targets, receive image data from said at least two cameras, identify said targets and determine the position of each identified target viewed by each camera according to pixel array co-ordinates said target image is coincident, and determine the distance of a said camera, and hence a reference point on or in said body to said identified targets by triangulation of pixel array coordinates for said identified targets.

In one specific form, a tracking system is provided having an array of cameras which views a set of optical targets. The position and orientation of the camera array is determined by triangulation. The processor includes multiple FPGAs (Field Programmable Gate Arrays). Each camera has an FPGA pipeline which is used to process an image from an individual CCD or CMOS camera, by first identifying the targets, calculating the coordinates of the targets to sub pixel resolution. The FPGA corrects the coordinates to account for lens distortion and camera errors. The FPGA then further uses previously stored target positions to calculate a target pixel apparent velocity and then communicates the resulting sub-pixel based target position and velocity to a further FPGA that combines the data from all of the cameras in the array to calculate a resulting position and velocity of the camera array and outputs the data to an industrial field bus such as Ethercat. The body with the camera array is fixed to an object to be tracked in six degrees of freedom. The FPGA pipeline allows fast data processing of the image and reduces the very large amount of image data to 12 numbers (representing 3 position coordinates, 3 orientations, three position velocities and three orientation velocities) and thereby minimises the data communicated to a data logging or control system.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Examples of the present invention will now be described with reference to the accompanying drawings, in which.

DETAILED DESCRIPTION OF THE PREFERRED EMBODIMENTS

An example of a tracking system 200 for tracking the position and/or orientation of an object 202 in an environment E will now be described with reference to FIG. 1.

Figure 1:
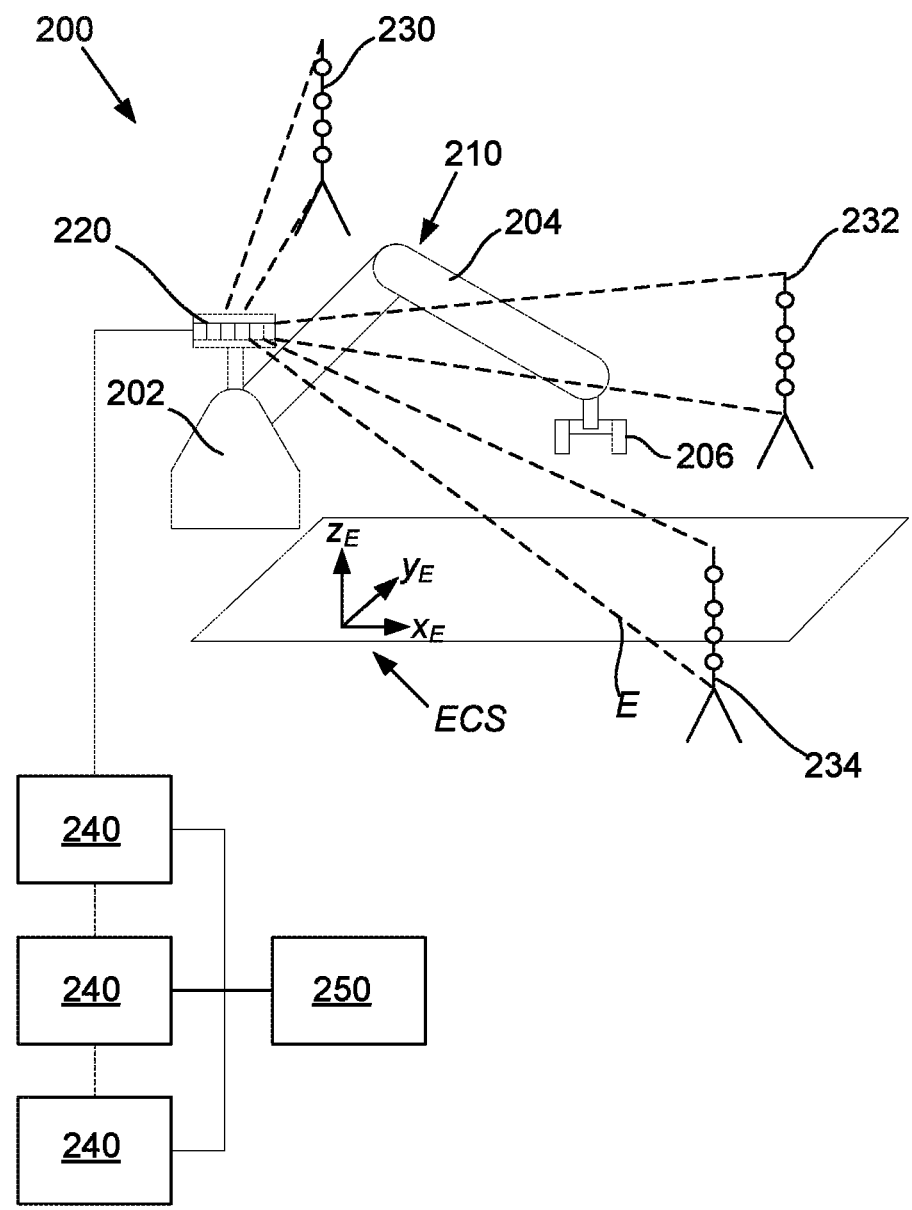
FIG. 1 is a schematic diagram of an example of a tracking system for tracking the position and/or orientation of an object in an environment.

In this example, it is to be understood that the object 202 typically forms part of a robot assembly 210 and in the example shown in FIG. 1 the object is a robotic component such as a robot base 202 which supports a robot arm 204 and end effector 206 programmed to perform interactions within the environment. The robot assembly 210 is positioned relative to an environment E, which in this example is illustrated as a 2D plane, but in practice could be a 3D volume of any configuration. In use, the end effector 206 is used to perform interactions within the environment E, for example to perform bricklaying, object manipulation, or the like.

The term "interaction" is intended to refer to any physical interaction that occurs within, and including with or on, an environment. Example interactions could include placing material or objects within the environment, removing material or objects from the environment, moving material or objects within the environment, modifying, manipulating, or otherwise engaging with material or objects within the environment, modifying, manipulating, or otherwise engaging with the environment, or the like.

The term "environment" is used to refer to any location, region, area or volume within which, or on which, interactions are performed. The type and nature of the environment will vary depending on the preferred implementation and the environment could be a discrete physical environment, and/or could be a logical physical environment, delineated from surroundings solely by virtue of this being a volume within which interactions occur. Non-limiting examples of environments include building or construction sites, parts of vehicles, such as decks of ships or loading trays of lorries, factories, loading sites, ground work areas, or the like.

A robot arm is a programmable mechanical manipulator. In this specification a robot arm includes multi axis jointed arms, parallel kinematic robots (such as Stewart Platform, Delta robots), spherical geometry robots, Cartesian robots (orthogonal axis robots with linear motion) etc.

An end effector is a device at the end of a robotic arm designed to interact with the environment. An end effector may include a gripper, nozzle, sand blaster, spray gun, wrench, magnet, welding torch, cutting torch, saw, milling cutter, router cutter, hydraulic shears, laser, riveting tool, or the like, and reference to these examples is not intended to be limiting.

It will be appreciated that in order to control the robot assembly 210 to accurately position the end effector 206 at a desired location in order to perform an interaction within the environment, it is necessary to be able to accurately determine the position and/or orientation of a reference point on the robot assembly.

In this example, the tracking system 200 includes at least one camera 220 mounted to the object 202. As will become apparent from the following description, preferably the system 200 will have more than one camera mounted to the object so as to form a camera array with a wide field of view of the environment in which the object 202 is moving.

The tracking system 200 further includes a plurality of spaced apart targets 230, 232, 234, at least some of said targets viewable by the at least one camera 220. In this example, a plurality of target arrays 230, 232, 234 are shown which in turn each have a plurality of clear and defined (i.e. discernible) optical targets. In this example, the targets are positioned around the environment at known locations and are used as reference markers which allow the system 200 to determine the position and/or orientation of the object 202. Whilst targets such as that shown in FIG. 1 are manually placed around the environment, this is not essential and in some examples, the targets may be fixed points of reference in the environment that are selected by the system as targets as will be described in further detail below.

The system 200 further includes one or more electronic processing devices 240, 250 configured to determine target position data indicative of the relative spatial position of the targets. The target position data is indicative of the position of the targets in the environment (i.e. in an environment or world coordinate system ECS). This data comprising the relative spatial position of the targets may be manually input to a processing device by a programming interface such as a keypad or may be provided as data measured by surveying equipment such as a total station used to survey the environment (e.g. a building site) once the targets have been placed. Alternatively, the target position data may be determined by creating a cartesian map of the environment with computer selected targets (such as fixed landmarks or reference points in the environment) forming part of the map and their positions determined relative to an environment coordinate system assigned to the map.

The one or more electronic processing devices 240, 250 then receive image data indicative of an image from the at least one camera 220, said image including at least some of the targets 230, 232, 234. The image data is then processed to identify one or more targets in the image and determine pixel array coordinates corresponding to a position of the one or more targets in the image. In this regard, it will be appreciated that typically the one or more targets are uniquely identifiable so that the processor is able to discern which target is in the image. This may be achieved in numerous ways as will be described in more detail below.

Finally, the one or more electronic processing devices use the processed image data to determine the position and/or orientation of the object by triangulation. Typically, the position of the one or more targets in the image is resolved to sub-pixel resolution in order to increase the accuracy of the triangulation. It will be appreciated that in some examples, the triangulation is performed using two cameras imaging one or more targets (preferably at least two targets) whilst in other examples the triangulation may be performed based on one camera imaging multiple targets. Any suitable method of performing triangulation known to a skilled person may be used in order to determine distance or range and orientation between the one or more targets being imaged and the at least one camera.

Figure 2A:
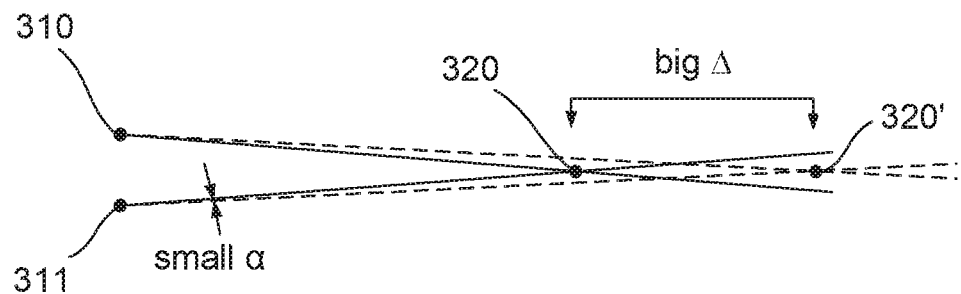
FIGS. 2A to 2B depict representations of a poorly and well conditioned triangulation problem.

It is to be understood that the above tracking system may be configured so that the triangulation is well conditioned in order to provide accurate location. Preferably, an array of cameras and targets are provided so that as orientation and position of the object changes, the triangulation remains well conditioned. The concept of the triangulation problem being poorly/well conditioned is illustrated schematically in FIGS. 2A and 2B. In FIG. 2A, a system that is poorly conditioned is shown in which cameras 310, 311 are closely spaced together viewing a target 320. It is to be appreciated that alternatively a camera 320 could be viewing closely spaced targets 310, 311. In this example, the position of the target is at 320. If the measured angle from the cameras to the target has a small error α this will translate into significant range uncertainty to the target represented by big Δ. The apparent position of the target then becomes 320' and an accurate distance to the target is therefore unable to be determined by triangulation.

Figure 2B:
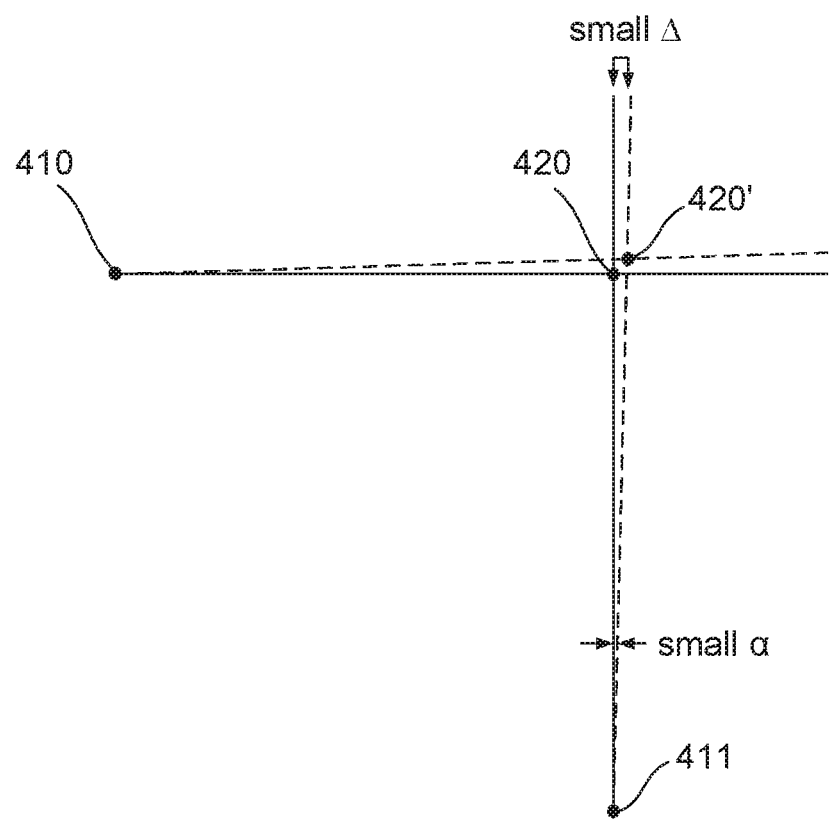

Conversely, in a triangulation problem as shown in FIG. 2B, the cameras 410, 411 are sufficiently spaced apart viewing target 420 so that a small angular error α between a respective camera and a target will translate into small range uncertainty to the target represented by small Δ. The apparent position of the target then becomes 420' and an accurate distance to the target can still be determined by triangulation. It is to be appreciated that 410, 411 may alternatively represent targets with a camera 420. The present tracking system is preferably optimised by selecting the number of cameras and targets and their spacing to ensure that wherever the object is in the environment, the triangulation problem remains well conditioned to ensure that accurate 6 DOF position and orientation measurements can be obtained.

The above described tracking system 200 provides a number of advantages. Firstly, it provides a camera based system using simple optical targets that can be easily setup or optionally selected by the system itself using fixed landmarks that already exist in the environment in which the object such as a robot is operating. Such a system is straightforward to implement and allows real time six degree of freedom (6 DOF) tracking of position and orientation of the object to be achieved for a fraction of the cost of existing systems. In this regard, prior systems typically use a laser tracker positioned in the environment which tracks a target on the object and relies on a laser beam having an uninterrupted line of sight to the target. Laser trackers have moving components and require precise alignment and calibration on a regular basis. They are relatively delicate instruments. They require particular care when being used on construction sites and when being transported. A laser tracker unit must be set up on firm ground when used on a construction site. If line of sight is lost or if the laser beam is broken for any reason, a laser tracker based system loses control of the object being tracked. The above described system provides flexibility in being able to select the optimal number of cameras and/or targets in order to be able to ensure uninterrupted tracking of the object as it moves through the environment as well as ensuring that with appropriate camera/target spacing the triangulation problem remains well conditioned.

A number of further features will now be described.

Typically, the system includes a body attachable to the object, the body having a camera array including a plurality of spaced apart cameras each having a field of view with a central axis, with the central axis of adjacent spaced apart cameras being divergently spaced by a predetermined fixed angle. In one example, the camera array is arranged to be as compact as possible whilst in other examples it may be advantageous to spread the cameras out in a distributed manner around the object (for example to improve line sight in some situations).

In one example, the fields of view of adjacent cameras of the camera array are at least partially overlapping so that at least some cameras can each view one or more common targets. This enables triangulation to be performed based on the known distance between the cameras and angular data to the target based on the pixel array coordinates.

In one example, the plurality of cameras (e.g. two or three spaced apart cameras) are spaced radially apart with their central axes lying in a common plane. In this arrangement, the fields of view of adjacent cameras are partially overlapping so that their fields of view intersect at a usable angle away from said common plane. Such a planar configuration of cameras would be of particular use for example in a system that maintains a substantially horizontal orientation of the radial camera array. Any suitable number of cameras may be included in the camera array (examples of which will be described below). Typically, the number of cameras in the camera array is selected from: 2, 3, 4, 5, 6, 7, 8, 9, 10, 11, 12, 13, 14, 15, 16, 17, 18, 19 and 20.

In another example, the body is spherical and the camera array includes a plurality of cameras arranged about the spherical body with their central axes spaced at predetermined angles. Such an arrangement would be of particular use when the camera array can have any arbitrary orientation.

It is to be appreciated that in this description a target may define either an individual point target or a target array comprising a plurality of point targets and furthermore that the plurality of spaced apart targets may be either user or computer generated. A user generated target is taken to include targets that are manually setup in the environment at predetermined locations by the user. A computer generated target is taken to include targets that are selected by the processor in accordance with fixed reference points that exist in the environment that the at least one camera is able to view. The targets may be selected by appropriate artificial intelligence or machine learning algorithms which are able to discern targets and make decisions around particular targets that should be chosen for use by the tracking system.

Referring now to user generated targets, the plurality of spaced apart targets may include a plurality of target arrays of predetermined configuration, each of the target arrays having at least three targets spaced apart from each other by predetermined distances. Typically, a target array has a unique spaced apart configuration of targets, compared with any other target array which assists the processor in identifying which particular target is being imaged.

A target array may take many forms including for example an upright mast on which the at least three targets are disposed in a spaced apart and colinear arrangement and a cross having upright and horizontal members each supporting a plurality of targets disposed in a spaced apart and colinear arrangement. In the example of a cross configuration of targets, a single camera imaging this array of targets would be able to determine its position and orientation based on the relative appearance of the targets (e.g. apparent distance between targets) as the camera moves closer/further away and rotates in yaw, pitch and roll relative to the targets. In one example, the targets are arranged on each mast or cross spaced apart from each other according to unique predetermined target spacings for each mast or cross.

Typically, the plurality of spaced apart targets include at least two target arrays manually locatable in predetermined spaced apart positions, viewable by the camera array when the object is located in an operating position in which its position and orientation is to be determined.

In another arrangement, the plurality of spaced apart targets are arranged in configurations selected from one or both of spaced apart along a straight line; and, spaced apart in two intersecting lines. In this example, the or each line of targets is horizontally disposed and typically one camera views targets in the first line and a second camera views targets in the second line.

Other techniques for assisting in the unique identification of targets may be employed. For example colour may be used to distinguish the targets. The targets may comprise ultra-bright light emitting diodes. In other preferred arrangements, entire target arrays may be coloured identically, while separate target arrays have targets coloured identically but in different colours.

In another example, time synchronisation of targets is used. In this example, the targets are lights such as light emitting diodes (LEDs) that are time synchronised to switch on and off at defined intervals to thereby allow a camera imaging a target to identify the target that is imaged. The processor can determine that for an image taken at a particular time, at that time, a particular target was programmed to be on which thereby identifies which target is in the image. Multiple cameras may each see the target that is on at the same time. In practice, the time interval would be in the order of milliseconds and to the human eye it would likely appear that all of the targets were on. If the targets are time synchronised the design of the target arrays is simplified and cost and setup time would be reduced.

In another example of the system, the body includes a surveying target such as an SMR (Spherical Mount Reflector) that is viewable by a surveying instrument to determine the position of the body relative to the surveying instrument. The surveying instrument is preferably selected from one of a theodolite such as a total station, or a laser tracker, in which case the surveying target on the body will be an optical target or reflector. In such an example, the camera array is used to determine the orientation of the body or determines the orientation and position of the body to supplement the position data from the surveying instrument, or provides a back-up where the surveying target is occluded due to site activity and the surveying instrument is temporarily unable to provide distance data. Such an example may allow simpler point targets to be used for the orientation determination and position may be measured more accurately with the laser tracker, however it includes a laser tacker or similar which will add expense to the tracking system.

Referring now to examples in which the computer generates or determines its own targets. In one example, the at least one camera images the environment and the one or more electronic processing devices are further configured to receive the image data from the at least one camera; and, analyse the image data to identify a number of potential targets using image recognition algorithms; select a plurality of the potential targets for use by the tracking system based at least in part on a set of target rules; and, determine a position and orientation of the selected targets in the environment. As previously mentioned the targets are fixed reference points in the environment which may include for discernible parts of existing structures such as fences, roofs, buildings, trees, light posts etc.

Typically, the one or more electronic processing devices create a map of the environment including the selected targets. The map may be created during initial setup of the object in the environment, for example when the environment is being calibrated to setup a coordinate system in which the targets are positioned.

In some examples, a user can at least one of select the targets based on a number of potential targets identified by the one or more electronic processing devices; and, override, confirm or delete targets selected by the one or more electronic processing devices. In this way, a user can ultimately still have a degree of control over which targets are selected to ensure for example that a transient target such as a parked car or object which may move is not selected as a target.

As the object moves and the at least one camera images the environment, the one or more electronic processing devices are configured to analyse image data to identify at least some of the selected targets for use in position and/or orientation determination. Different targets would be selected as the object moves through the environment and better targets come into view of the at least one camera.

In one example, the system includes at least one initial reference target at a known location in the environment and wherein the one or more electronic processing devices are configured to determine the position and/or orientation of the object by imaging the at least one initial reference target; and, determine the position and/or orientation of one or more random targets at unknown locations in the environment using the determined position and/or orientation of the object. The initial reference target may be removed after a predefined number of random targets have been positioned in the environment by the one or more electronic processing devices. In this type of system, new targets can be established as the object moves through the environment. The above described system is based on a forward position calculation from the at least one camera to the targets and then a backward position calculation from the targets to the at least one camera. If a known target is used as an initial reference, then the at least one camera can calculate its position and orientation (via the backward calculation) and then calculate the position of the "unknown" or random targets using the forward calculation. Once enough random targets have been measured, the initial reference target can be removed and the at least one camera will continue to know where it is (from the backward calculation from the random targets) and can establish the position of new random targets via the forward calculation, and by doing this continuously or at intervals as it moves, can continue to establish new targets as it moves into new regions.

Typically, a target position in an image is determined by the one or more electronic processing devices analysing pixel target saturation, to determine pixel array coordinates for the centre of the target.

It will be appreciated that triangulation is performed on the processed image data to determine at least the distance between a target and a camera and that was previously described the system is configured to ensure that the triangulation problem is always well conditioned to provide distance accuracy.

Preferably, the pixel array coordinates corresponding to the position of a target are determined to sub-pixel resolution using any suitable sub-pixel resolution algorithm. The pixel array coordinates corresponding to the position of the target in the image are indicative of angular data representing a target heading angle and an elevation angle. This angular data is used in the triangulation to determine the position and orientation of the at least one camera.

In some instances it is also preferable to determine the velocity of the object in addition to its position and orientation. In one example, previously stored images are analysed by the one or more electronic processing devices to determine a rate of change of the target heading angle and target elevation angle for use in determining the velocity of the object.

It will be appreciated that the system also typically includes a look-up table of calibration data stored in memory of the one or more electronic processing devices, the calibration data including pixel position values and range cor- related to camera focusing data, so that observed target pixel array coordinates have camera focusing data applied to thereby apply range correction in the determination of distance to targets. This enables the pixel array coordinates to be corrected for lens distortion and camera errors.

The camera used in the system is typically a digital camera having one of a charge-coupled device (CCD) image sensor; and, a complementary metal oxide semiconductor (CMOS) image sensor. Currently available high speed CMOS sensors can provide multi mega pixel images at high frame rates. For example the Alexima AM41 sensor can provide 2336×1728 pixels at 500 frames per second (fps). Sub pixel resolution algorithms calculate target position to approximately one tenth of a pixel. In an example using 20 cameras to obtain 360 view angle, the sub pixel horizontal resolution is 2336×20×10/360=1298 sub pixels per degree or 0.0007 degrees. The sensors and optics in the camera array can be calibrated by imaging known points, or a grid, in multiple orientations of the camera array and applying a mathematical table of corrections. Thus each camera pixel coordinate can be mapped to a calibrated actual angle.

Preferably, the or each camera is connected to a dedicated image processor for processing the image data from the camera. The image processor is typically a Field Programmable Gate Array (FPGA) or an Application Specific Integrated Circuit (ASIC) but in other examples could be a microprocessor or a microcontroller.

The image processor of each camera sends data via a data bus to a dedicated position and velocity processor that determines the position, orientation and velocity of the object. The position and velocity processor is typically a Field Programmable Gate Array (FPGA) or an Application Specific Integrated Circuit (ASIC) but in other examples could be a microprocessor or a microcontroller. The position and velocity processor typically outputs data to a control and logging system via a fieldbus link such as Ethercat to enable the data to be used in the positional control of the robot end effector so that it can perform an interaction in the environment.

In another broad form, the present invention provides a method of tracking the position and/or orientation of an object in an environment, the method including mounting at least one camera to the object so that at least some of a plurality of targets are viewable by the at least one camera when the object is located in an operating position in which its position and/or orientation is to be determined; and, the method further including in one or more electronic processing devices: determining target position data indicative of the relative spatial position of the targets; receiving image data indicative of an image from the at least one camera, said image including at least some of the targets; and, processing the image data to: identify one or more targets in the image; determine pixel array coordinates corresponding to a position of the one or more targets in the image; and, using the processed image data to determine the position and/or orientation of the object by triangulation.

Typically, the method includes mounting a camera array to the object, the camera array including at least two cameras that are at least one of housed in a body attached to the object; and, distributed around the object.

Figure 3:
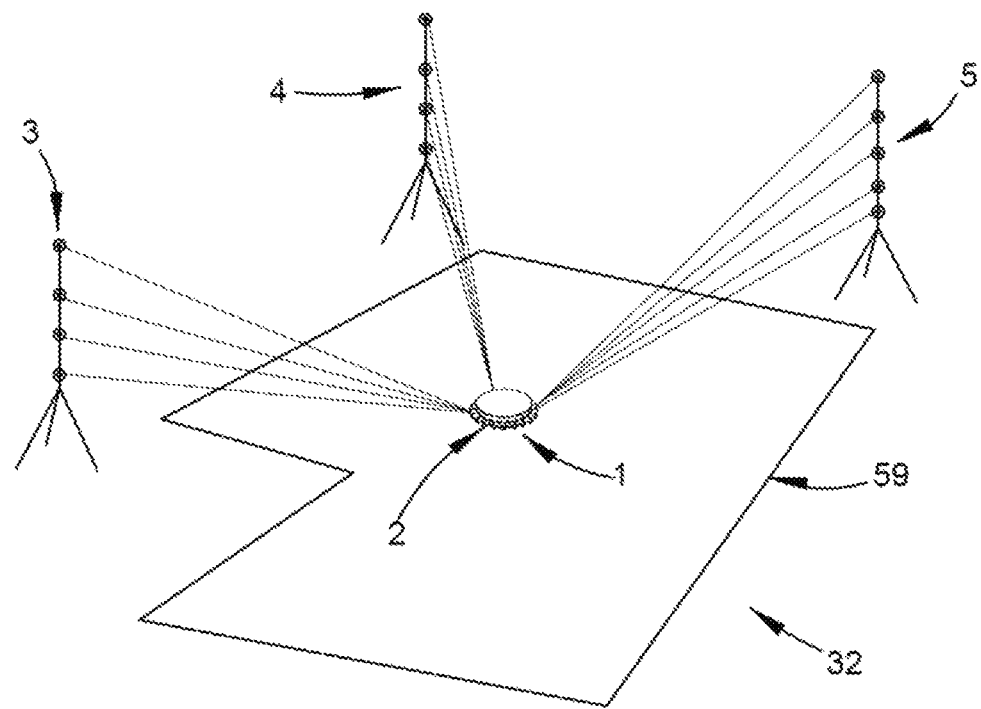
FIG. 3 is a schematic diagram of an example of a tracking system for tracking the position and/or orientation of an object in an environment.

Referring to FIG. 3, a six degrees of freedom tracking system 32 is illustrated. The six degrees of freedom tracking system 32 is designed to track the position and orientation of an object in space. The six degrees of freedom tracking system 32 tracks the position of the object in three dimensions returning coordinate values for x and z coordinates in a horizontal plane and a value for height coordinate y. The six degrees of freedom tracking system 32 also returns values for pitch, roll and yaw of the object. The present application for the six degrees of freedom tracking system 32 is tracking the position and orientation of a brick laying and adhesive applying head within the confines of a building site, and is used to assist with the control of a brick laying robot in the construction of a building such as a house on a slab 59. It will be appreciated that this example is not intended to be limiting.

The six degrees of freedom tracking system 32 is provided with a body 1, provided with twenty cameras located radially in a horizontal plane to form a camera array, one of the cameras of the array being is indicated at 2. The cameras collectively view three target arrays 3, 4, 5. In practice each camera has a narrow field of view and each target will normally be visible to a single camera in the camera array 1, and at the most, two cameras in the camera array 1. Where the target concerned is visible to two cameras it will typically be due to orientation of the body 1 in a position where target is located in the overlapping fields of view of two adjacent cameras.

Figure 4:
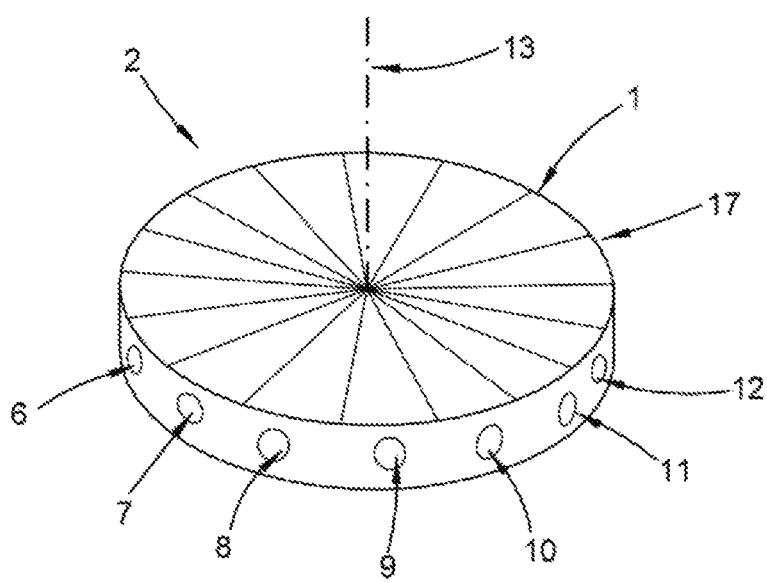
FIG. 4 is a schematic isometric view of an example of a body housing a camera array of the tracking system of FIG. 1.

FIG. 4 shows the first embodiment of the camera array showing the body 1 as an over-square cylinder with seven of the twenty cameras in this embodiment being visible, being cameras indicated at 6, 7, 8, 9, 10, 11 and 12. The cameras in the camera array are arranged radially around a central axis 13. This camera array with its horizontal configuration is optimised for a system that maintains a substantially horizontal orientation of the radial camera array, with axis 13 remaining substantially vertical. Pitch, roll and yaw of the object will be detected by the camera array and can be corrected for in the control of the orientation of the object to which the camera array is affixed. Further detail of the first embodiment of the camera array is shown in FIGS. 17, 18, 19 and 20.

Figure 5:
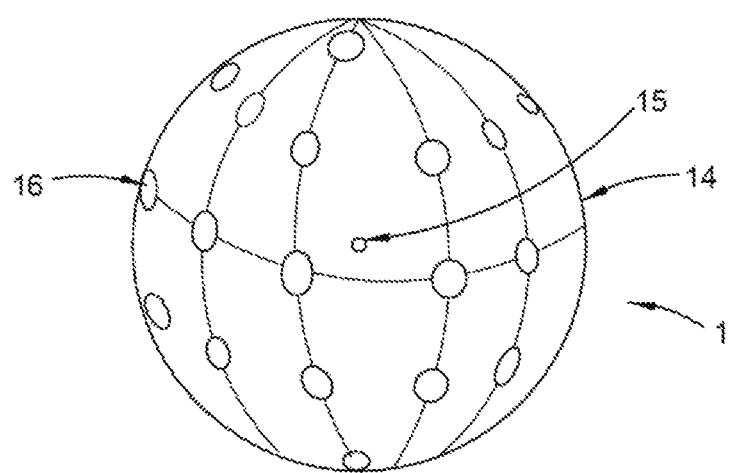
FIG. 5 is a schematic isometric view of an example of a spherical body housing a camera array.

FIG. 5 shows a second alternative embodiment of a camera array, provided as an alternative camera array to that shown in FIG. 3. The second embodiment of the camera array has a spherical body 14 with cameras 16 arranged in a spherical pattern about a central point 15. The camera array of the second embodiment is used in a tracking system that can have any arbitrary orientation.

Those skilled in the art will appreciate that the number and orientation of the cameras can be arranged to maintain line of sight and accommodate the structural requirements of the object being tracked. Positions for the cameras 16 on the spherical body 14 of the camera array can be determined using known algorithms.

Figure 6:
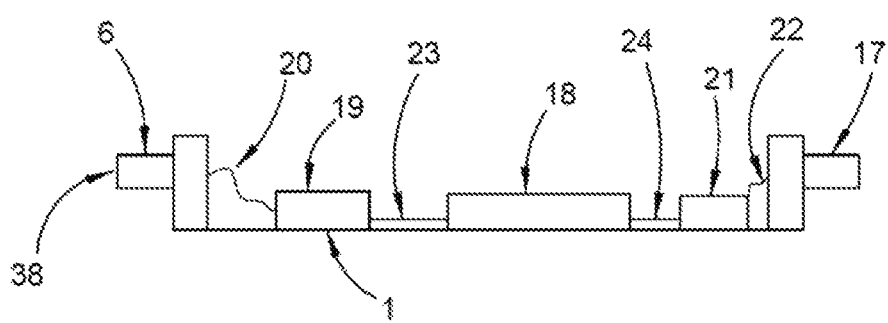
FIG. 6 is schematic cross section through the centre of the body of FIG. 2.

FIG. 6 shows a transverse cross-section of the first embodiment of the camera array of the first embodiment. A first camera 6 is shown mounted to the body 1 and on the opposite side of the body 1 is mounted a second camera 17. First camera 6 is connected to a first FPGA (field programmable gate array) 19 by a high speed data bus 20. The second camera 17 is connected to a second FPGA 21 by second high speed data bus 22. The first FPGA 19 and the second FPGA 21 are connected respectively to a 6 DOF position and velocity FPGA module 18 by a first data bus 23 and a second data bus 24. The individual FPGAs 18, 19 and 21 and the data busses 20, 23, 24 and 22 could be implemented on a common PCB or set of pluggable PCBs or the FPGAs could exist as IP cores within a larger single FPGA. All of the devices could be combined into or implemented as ASICS (application specific integrated circuits).

The first camera 6 and the second camera 17 are representative of each camera in the camera array 1, and each camera 6 is directly connected with a high speed bus 20 to an FPGA 19. That is, in the camera array, each camera is connected by a high speed bus to a FPGA dedicated to that camera. All twenty of these FPGAs are connected to the 6 DOF position and velocity FPGA module 18.

Figure 7:
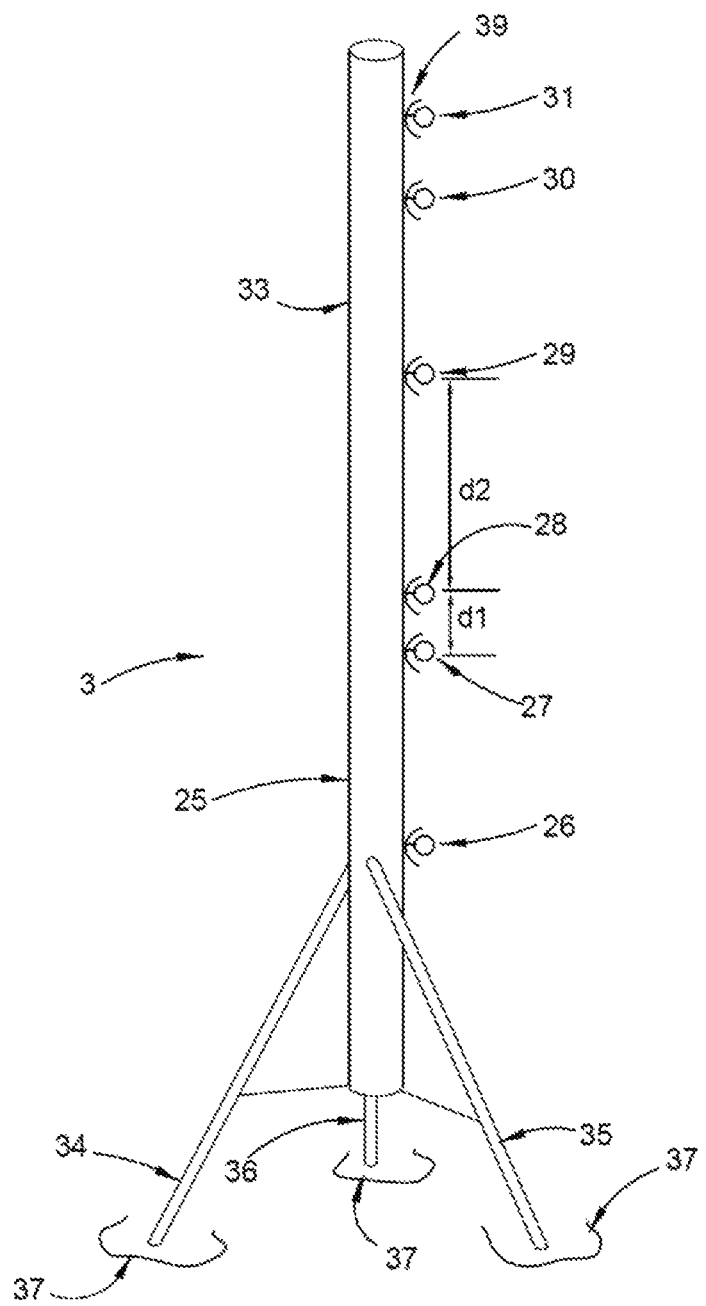
FIG. 7 is a schematic perspective view of an example of a target array of the tracking system of FIG. 1.

FIG. 7 shows a target array 3. The target array 3 has a structure 25 that supports targets 26, 27, 28, 29, 30 and 31. The number of the targets 26-31 on the target array and the arrangement of the targets 26-31 on the target array can be varied without deviating from the concept and scope of the present invention. While the first embodiment illustrated in FIG. 3 shows three targets, increasing the number of target arrays 3 in the tracking system 32 increases both the system accuracy and the probability of line of sight from as many as possible of the total number of targets on the target arrays to the camera array.

The targets 26-31 are uniquely arranged on the target array 3 so that the distance between adjacent targets 26-31 is always unique. This unique coding of adjacent target 26-31 distance allows each target 26-31 to be uniquely identified. In the preferred embodiment of the target array 3, the targets 26-31 are arranged in a substantially vertical pattern. Each target can be assigned a unique upper/lower ratio which is the distance to the target above it divided by the distance to the target below it, for example in FIG. 7, target 28 has an upper/lower ratio=d2/d1. The upper/lower ratio for each target 26-31 uniquely identifies each target 26-31. In addition to this, each target array 3, 4 or 5 is different from the others by having the targets 26-31 spaced differently. This allows the target arrays 3, 4 and 5 to be readily distinguished from each other.

Referring to FIG. 7, in the preferred embodiment of the target array 3, the structure 25 consists of a substantially vertical tube 33 supported by three legs 34, 35 and 36 which rest on the ground 37. In the preferred embodiment of the target array 3, the structure 25 is made of carbon fibre reinforced plastic painted highly reflective white to minimise thermal distortion.

In the preferred embodiment of the target array 3, the targets 26 to 31 are ultra-bright coloured LEDs. In the preferred embodiment of the camera 6, the camera 6 is fitted with a filter 38 that passes the colour of the targets 26-31 and rejects other colours. In the preferred embodiment of the targets 26 to 31, each target 31 is fitted with a combined lens, reflector and shield 39 that projects a light field of uniform shape that does not impact the structure 25 of the adjacent target array 3.

Figure 8:
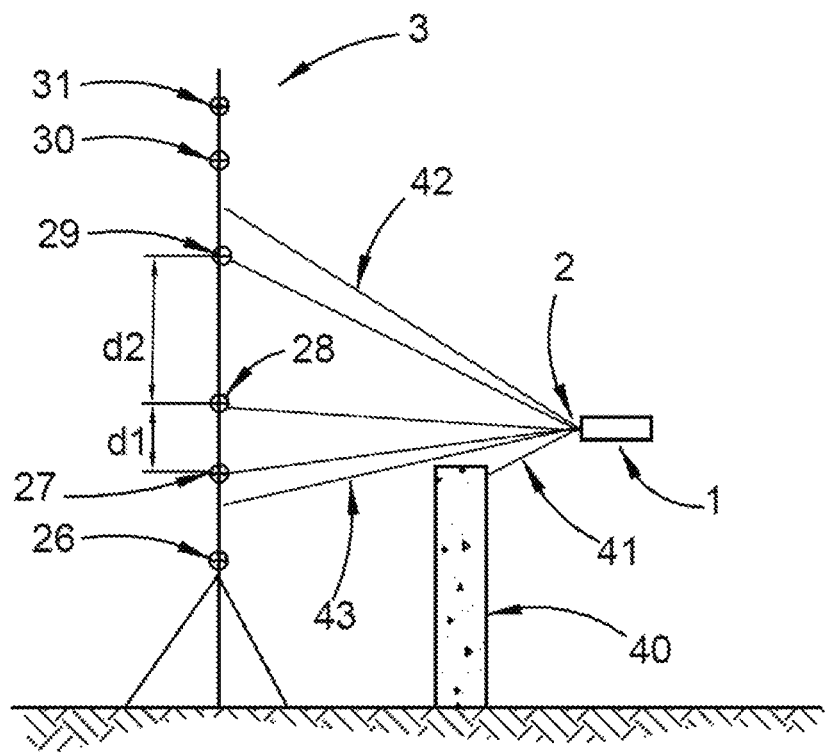
FIG. 8 is a schematic side view of the tracking system of FIG. 1 imaging a target array with an obstruction between the camera array and the target array.

FIG. 8 shows the camera array 1 located near an obstruction 40. FIG. 8 shows that the camera 2 has a lowermost line of sight 41 that is obstructed by the obstruction 40, and an upper most line of sight 42. Since the lowermost line of sight 41 is obstructed by the obstruction 40, target 26 is not visible to the camera 2. In FIG. 6 the target 27, being above the obstruction 40, is visible to the camera 2. Targets 30 and 31 are above the upper most line of sight 42 and are not visible to the camera 2. Targets 27, 28 and 29 are above the line of obstruction 43 and below the uppermost line of sight 42 and are therefore visible. The upper/lower ratio d2/d1 uniquely identifies target 28 and therefore all other visible targets 27-29 of the target array 3. Even when the complete target array 3 is not visible to the camera. 2, the targets can be uniquely identified by their relative position and the upper/lower ratio, provided that at least three consecutive targets 26-31 are visible to the camera 2.

Figure 9:
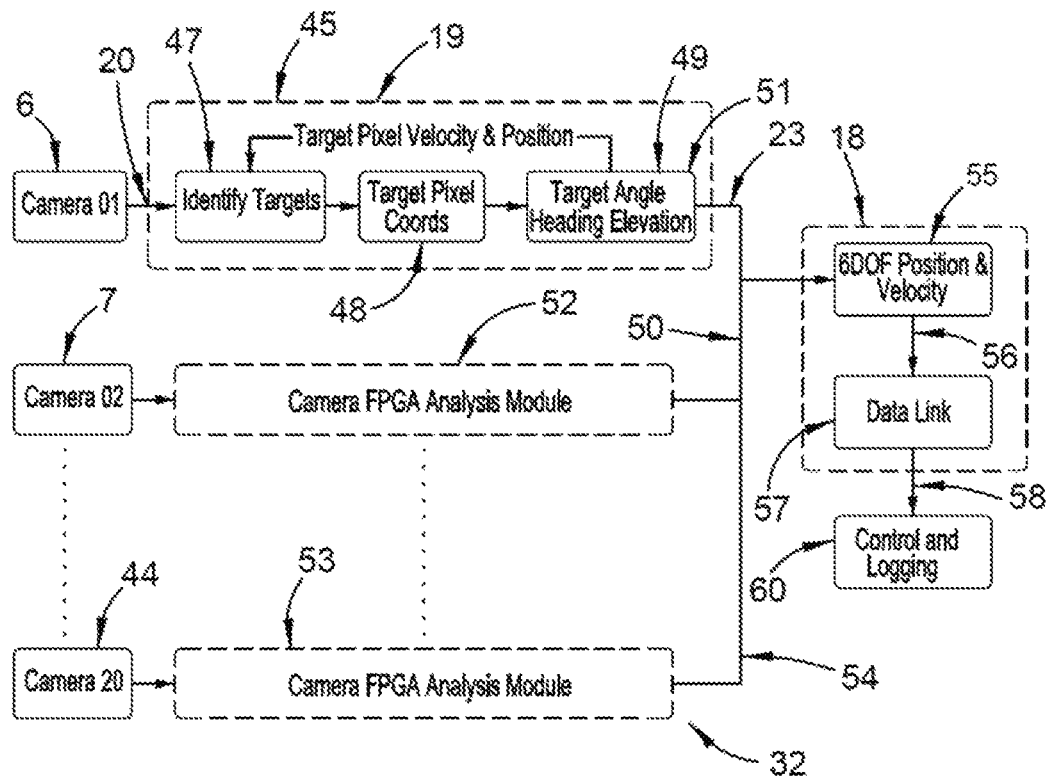
FIG. 9 is a schematic diagram of an example of a data processing pipeline implemented for the tracking system of FIG. 1.

FIG. 9 shows the data processing pipelines. In the preferred embodiment illustrated in FIG. 9 there are twenty cameras being "Camera 01" 6, "Camera 02" 7, "Camera 03" to "Camera 19" which are not shown, and "Camera 20" 44.

Each camera has a similar data processing pipeline which will be illustrated by describing the camera data processing pipeline 45 for "Camera 01" 6. "Camera 01" 6 is connected by a high speed data bus 20 to a camera FPGA analysis module 19. The FPGA camera analysis module 19 contains programmed gate arrays whose purpose is in a first step 47 to identify the targets 26 to 31 shown in FIG. 5. In a second step 48, the images of the targets 26 to 31, if present, of the targets 26-31 are identified by considering pixels with the correct values that are in the correct relationship with the surrounding pixels, and the targets identified in the previous photo. Thus pixel noise and false targets may be rejected. The target pixel coordinates of the centre of the target are then calculated by using industry standard machine vision gate array methods.

The "Camera 01" 6 would have been previously calibrated using standard machine vision techniques. These follow a procedure where the camera takes a picture of the target. The pixel location is mapped to an A and B ray angle from a focal point known in 3D. The focal point is dependent upon the focus of the camera and also the pixel location; that is, the rays from the lens may be skew and not all originate from the same focal point. The aim of camera calibration is to determine for each pixel, the focus distance for each object distance, the 3D focal point coordinate and the A and B ray angles from the focal point coordinate. In a first instance, the calibration table consists of data for each individual pixel. In a second instance, the data set can be linearised so that a linear (or other deterministic function fit) best fit approximation is applied to the data between suitably spaced pixels. For example, lens distortion characteristics are such that the changes in calibration data can be considered to be linear across a small range, say (ten) pixels. This reduces the calibration data set size from say a 2000×1000 pixel array, to a calibration data set of say 200×100 (a 100 fold reduction in calibration data). Furthermore, this simplifies the calibration process, because rather than determining the A, B ray angles and focal data for each pixel, a calibration plate can be used which provides an X, Y target that is imaged onto a pixel, and via sub pixel resolution techniques, thereby to a sub pixel coordinate p, q. Each calibration plate target is imaged to a sub pixel resolution, with corresponding focal distance d data stored.

| For each camera MEASURED DATA | | | | |
|---|---|---|---|---|
| Calibration plate | | Camera | | |
| Target | | Distance | sub pixel coordinate | focal distance |
| X | Y | D | p q | d |
| 0 | 0 | 1000 | 25.1 50 | 23.215 |
| 0 | 10 | 1000 | 25.3 150 | 23.217 |
| 10 | 10 | 1000 | 125.4 150 | 23.218 |
| 0 | 0 | 2000 | 12.51 25.3 | 24.103 |
| 0 | 10 | 2000 | 12.32 75.2 | 24.102 |
| 10 | 10 | 2000 | 62.17 75.3 | 24.102 |

The measured data is then used to construct the calibration table at the desired calibration interval (e.g. ten pixels). These techniques are known and standard. The known process is extended by being repeated at different object (calibration plate) distances D by moving the calibration plate by a known amount. Multiple positions of the calibration plate then allow the A and B ray angle calibration data and the focal point coordinate to be determined for each calibration interval. This constructs a multi-dimensional look up table that for the calibration pixel p, q and object distance D, has calibration data (A, B ray angles, and x,y,z focal point coordinate.

| DERIVED CALIBRATION DATA | | | | | | | |
|---|---|---|---|---|---|---|---|
| Sub pixel coordinate | | Object Distance | Focal Distance | Ray angles | | Focal point coordinates | |
| p | q | D | d | A | B | x y | z |
| 0 | 0 | 1000 | | | | | |
| 10 | 0 | 1000 | | | | | |
| 20 | 0 | 1000 | | | | | |
| 30 | 0 | 1000 | | | | | |
| ... | | | | | | | |
| 0 | 10 | 1000 | | | | | |
| 10 | 10 | 1000 | | | | | |
| 20 | 10 | 1000 | | | | | |
| 30 | 10 | 1000 | | | | | |
| ... | | | | | | | |
| 0 | 0 | 2000 | | | | | |
| 10 | 0 | 2000 | | | | | |
| 20 | 0 | 2000 | | | | | |
| 30 | 0 | 2000 | | | | | |
| ... | | | | | | | |
| 0 | 10 | 2000 | | | | | |
| 10 | 10 | 2000 | | | | | |
| 20 | 10 | 2000 | | | | | |
| 30 | 10 | 2000 | | | | | |
| ... | | | | | | | |

This technique is further extended so that the calibration plate is imaged by multiple cameras. It may be further extended so that the calibration plate is a series of plates encircling the camera array. Alternatively the camera array may be mounted to a turntable that can be accurately moved through an angle, thereby presenting different cameras to view the calibration plate. Alternatively the camera array may be mounted on a tilting turntable that can be rotated and tilted accurately to present different cameras to view the calibration plate. The calibration process is automated to collect the required data.

The camera error corrections are then applied in a third step 49 resulting in data 51 consisting of the target heading angle and target elevation angle and also a rate of change of the target heading angle and a rate of change of the target elevation angle. The data 51 is transmitted on a data bus 23 to the 6 DOF position and velocity FPGA module 18. Each FPGA analysis module 19, 52, 53 and the seventeen others (not shown) is connected to the data bus 50 and passes the target heading and elevation angle data 51 to the 6 DOF position and velocity analysis FPGA module 18. As IC (integrated circuit) technology advances and FPGA and ASIC technology improves, it may be possible to combine the various FPGA modules shown into fewer modules, or perhaps even one module. With the state of the technology as at 2017, the preferred embodiment is to use an FPGA for each FPGA camera analysis module 46 and an FPGA for the 6 DOF position and velocity FPGA module 18.

The 6 DOF position and velocity FPGA module 18 uses well known navigation and statistical algorithms to combine the multiple target heading angle, elevation angle and velocity data to calculate a single set of 6 DOF position and velocity data 55 for the camera array 1, which is transmitted by an internal data link 56 to a data link module 57 which formats and transmits the data to an external data link 58.

In the preferred embodiment the data link 58 is an Ethercat fieldbus. In other embodiments the data link 58 could be an industrial field bus such as Modbus, RS232, Profibus, Sercos, Powerlink, RT Ethernet, UDP ethernet or in non-realtime applications TCPIP ethernet. In a further embodiment, the data link 58 could be a number of simulated encoder outputs in any type of encoder format such as quadrature, BiSS, Hiperface, Endat or as simulated resolver output. In less preferred embodiments, the data link 58 could be multiple analogue signals such as 4-20 mA current loop or +−10V analogue.

The datalink 58 connects the 6 DOF tracking system 32 to a control and logging system 60.

Figure 10:
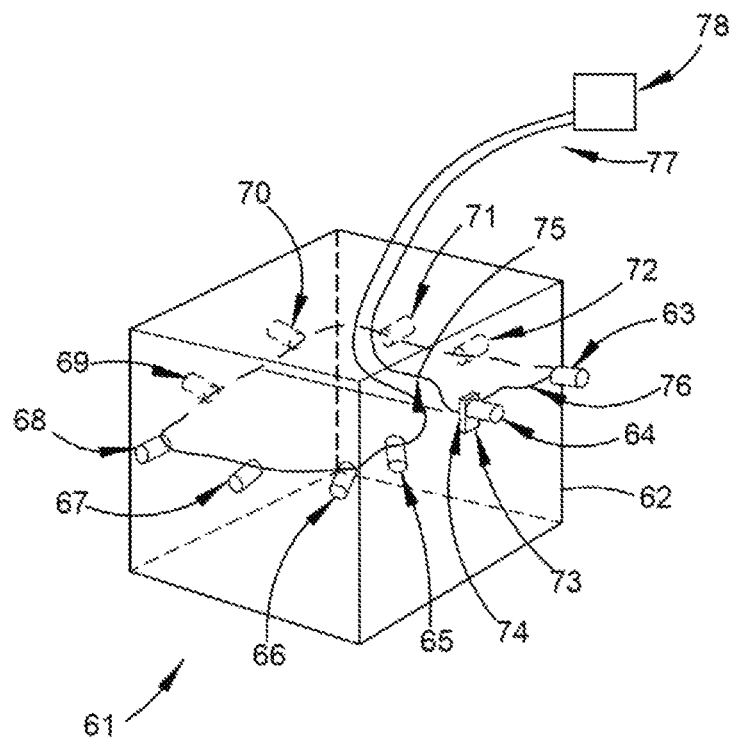
FIG. 10 is a schematic perspective view of an example of a distributed camera array.

In some instances it will be most convenient for the camera array 1 to be as compact as possible. In other instances it may be necessary for reasons such as line of sight for the camera array 1, to be spread out. In some situations, it may be advantageous for the camera array to be distributed around an object. FIG. 10 shows a distributed camera array 61 around an arbitrary object 62. The ten cameras 63-72 are distributed around the object 62. Each camera has a directly connected camera analysis module, not shown for clarity for cameras 63 and cameras 65-72, but shown for camera 64 which is directly connected to camera analysis module 73. Camera analysis module 73 includes a field bus connection 74. The fieldbus connection 74 is connected by a first cable 75 to the fieldbus network 77 and by a second cable 76 to the fieldbus network 78 which includes the other cameras 63 and 65 to 72 and a control system 78. Each camera 63 to 72 transmits via its respective camera analysis module, the target pixel coordinates and pixel velocity as numerical data to the fieldbus network 77. In the preferred embodiment of the distributed camera array 61, the fieldbus network 77 is an Ethercat network and the control system 78 is a Twincat master on an industrial PC. The control system 78 includes a software module to combine the camera data and calculate the 6 DOF position and velocity.

Figure 11:
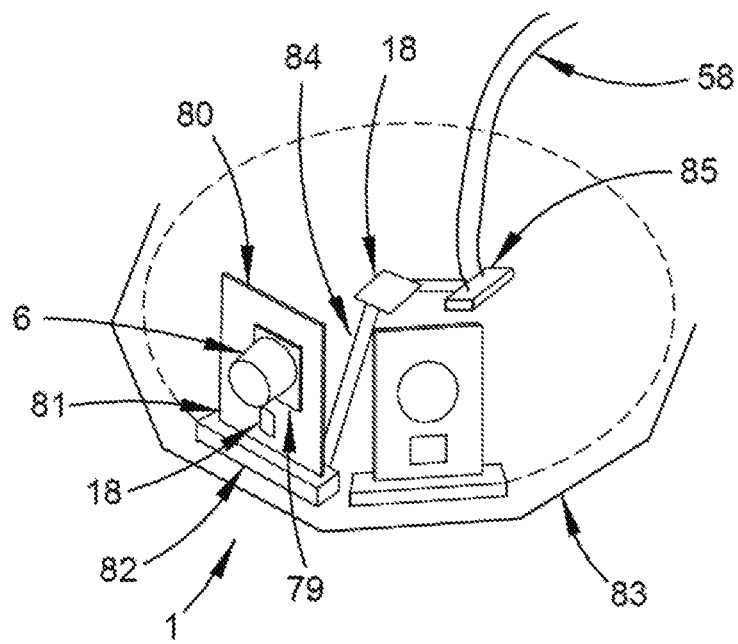
FIG. 11 is schematic perspective view of part of the camera array of FIG. 2 showing electronic construction details.

FIG. 11 shows a preferred embodiment of the construction of the electronics of the camera array 1 shown previously in FIGS. 2 and 15 to 18. Each camera 6 has a CMOS or CCD IC 79 surface mounted to a first PCB 80. First camera PCB 80 includes the FPGA camera analysis module 18. Each camera PCB 80 is fitted by an edge connector 81 to a socket 82 surface mounted to a back plane PCB 83. Each edge connector socket 82 has tracks 84 connecting it to the 6 DOF position and velocity module 18 which is then connected to the fieldbus connectors 85 which in turn connect to the external data link 58.

Figure 12:
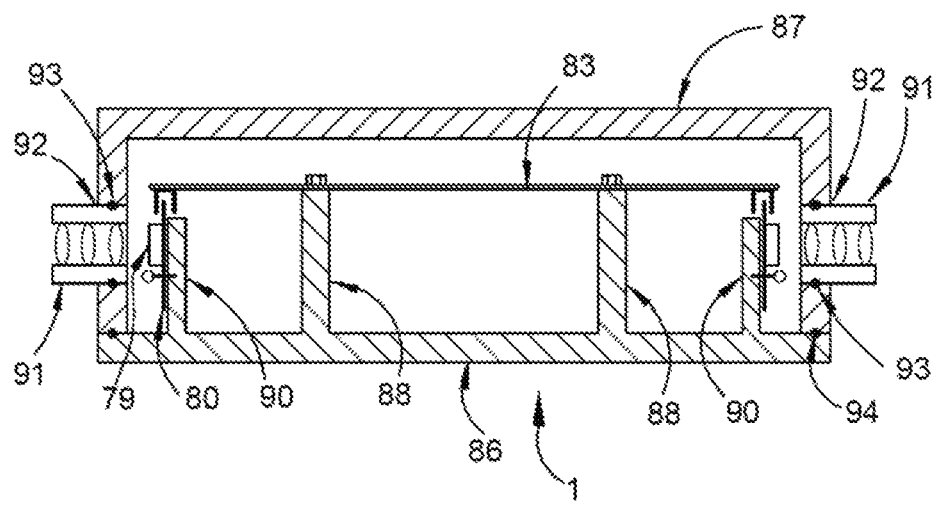
FIG. 12 is a schematic cross sectional view of the camera array of FIG. 2 showing details of two diametrically opposed cameras.

FIG. 12 shows a cross section of a first embodiment of the assembly of the electronics of the camera array 1 into a CNC machined billet 6061-T6 aluminum lower housing 86 and upper housing 87. The back plane PCB 83 is screwed to multiple standoffs 88 which may be integrally machined with the lower housing 86. Each camera PCB 80 is screwed to camera mount bosses 90 which may be integrally machined with the lower housing 86. Lenses 91 are fitted in holes 92 and sealed with O rings 93. The upper housing 87 is mechanically fastened (not shown) to the lower housing 86 and sealed with an O ring 94.

Figure 13:
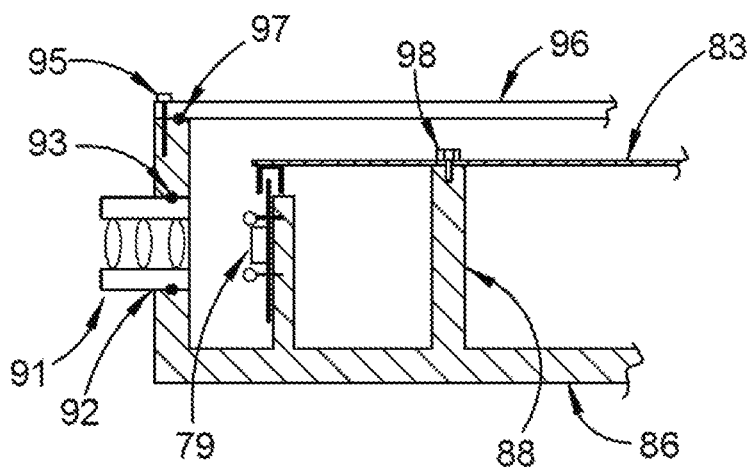
FIG. 13 is a schematic part cross sectional view of another example of a camera array.

FIG. 13 shows a cross section of a second embodiment of the assembly of the electronics of the camera array into a lower housing 86, which also mounts the lenses 91 in holes 92 which are sealed with O rings 93. A lid 96 is fastened to the lower housing 86 with screws 95 and sealed by an o ring 97. The back plane PCB 83 is mounted to standoffs 88 that are integrally machined with the lower housing 86, by screws 98.

Figure 14:
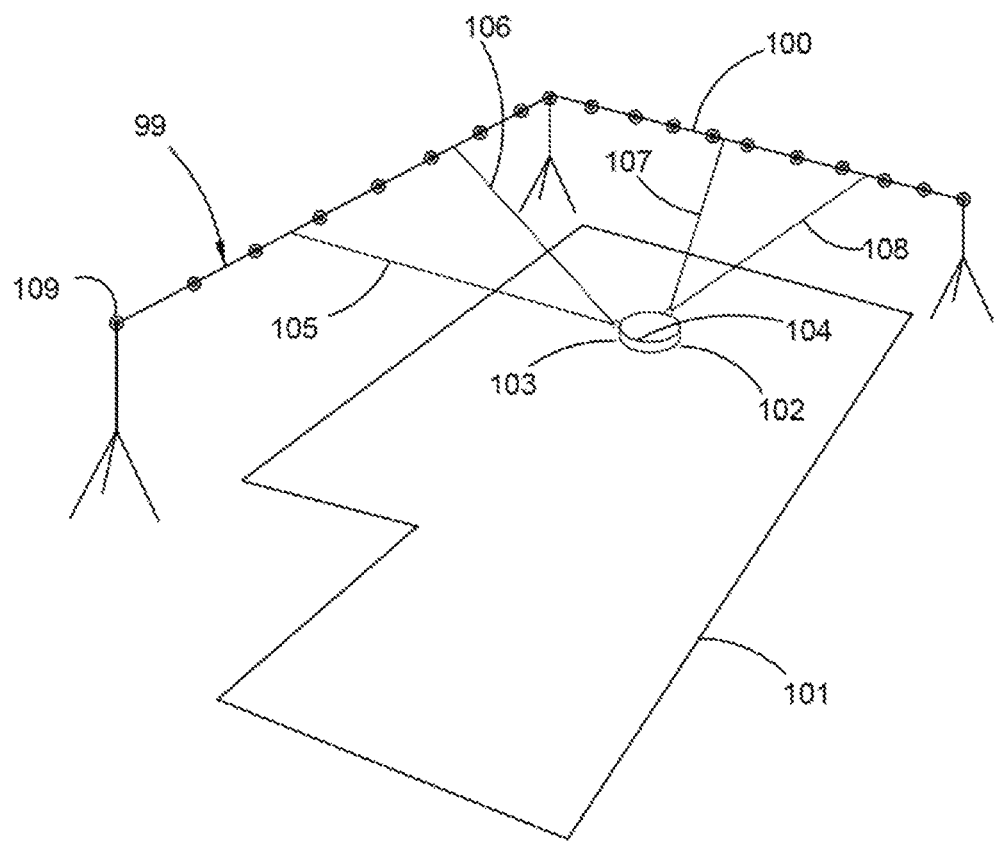
FIG. 14 is a schematic isometric view of another example of a tracking system for tracking the position and/or orientation of an object in an environment.

FIG. 14 shows an alternative embodiment with a first horizontal target array 99 and a second horizontal target array 100, located normal to each other and spaced from two boundaries of a working envelope 101. In this embodiment the camera array 102 has a minimal plurality of cameras, in this case a first camera 103 and a second camera 104. The first camera 103 has lines of sight 105, 106, and the second camera 104 has lines of sight 107, 108. The first camera 103 must maintain vision of at least three targets on the first horizontal target array 99 and the second camera 104 must maintain vision of at least three targets on the second horizontal target array 100 for the embodiment 101 to be able to calculate its position and orientation. This defines the working envelope 101 of this embodiment. An advantage of this embodiment is that fewer cameras 103, 104 are required than in the other embodiment of the camera array 1. A disadvantage of this embodiment is that the working envelope 101 is reduced in area and the orientation of the camera array 102 must only vary within a small range so that the target arrays 99, 100 are in view of the respective cameras 103, 104.

Figure 15:
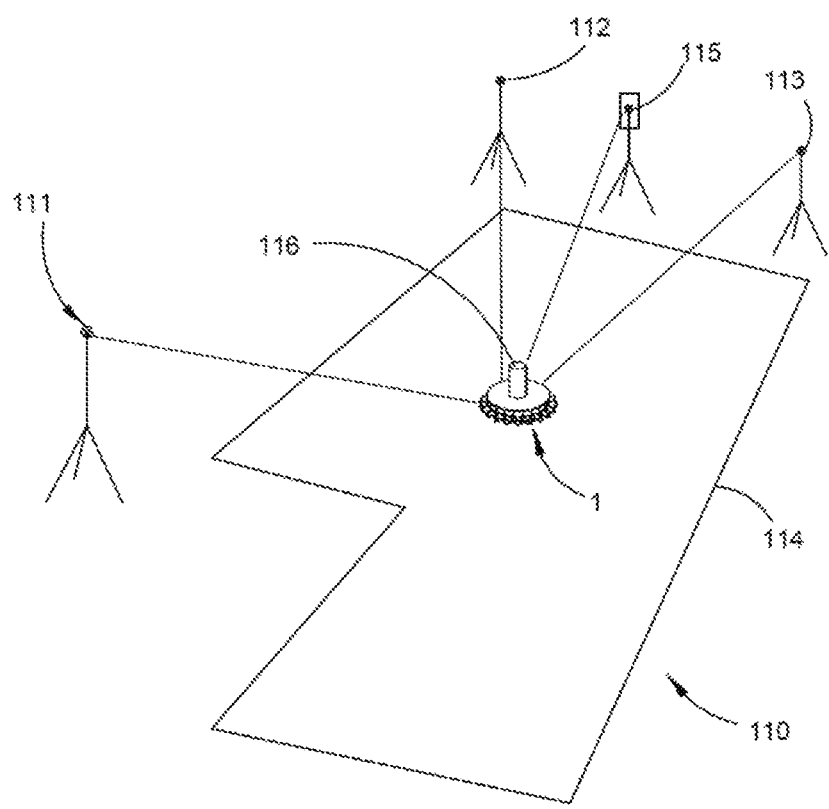
FIG. 15 is a schematic isometric view of another example of a tracking system for tracking the position and/or orientation of an object in an environment.

FIG. 15 shows an embodiment of the tracking system 110 in which three single targets 111, 112, 113 are placed around a working area 114. A three axis laser tracker 115 is set up adjacent to the working area 114. The camera array 1 supports a laser tracker target 116 such as an SMR (Spherical Mount Reflector). The laser tracker 115 tracks the 3D position of the laser tracker target 116. No orientation data is available from the three axis laser tracker 115 because it measures only the position of the laser tracker target 116. The camera array 1 is used to measure the orientation. During set up it is possible for the laser tracker 115 to measure the precise position of the targets 111, 112 and 113. Alternatively, once the camera array 1 has been moved to three different positions (not shown), the precise position of the targets 111, 112, 113 can be determined by known surveying or navigation calculations. This embodiment of the tracking system 110 has the advantage that it may measure position more accurately than the embodiment of the tracking system 32 but with the disadvantage that it adds an expensive laser tracker 115 and requires more set up work to set up the laser tracker 115. The targets 111, 112 and 113 are simpler than the target arrays 3, 4, 5, 99, 100.

Figure 16:
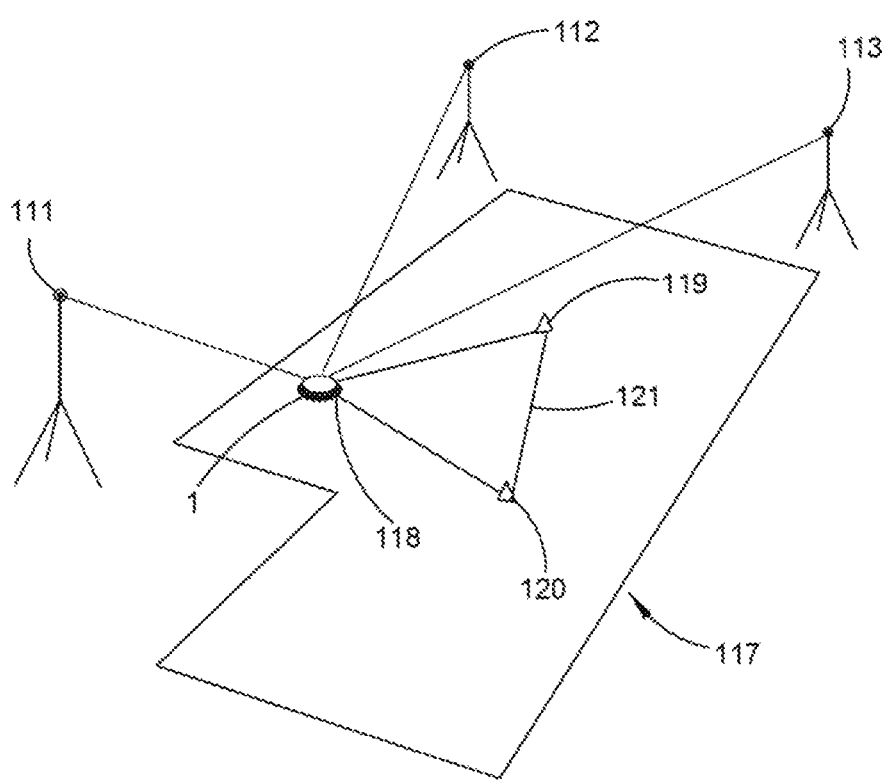
FIG. 16 is a schematic isometric view of another example of a tracking system for tracking the position and/or orientation of an object in an environment.
Figure 17:
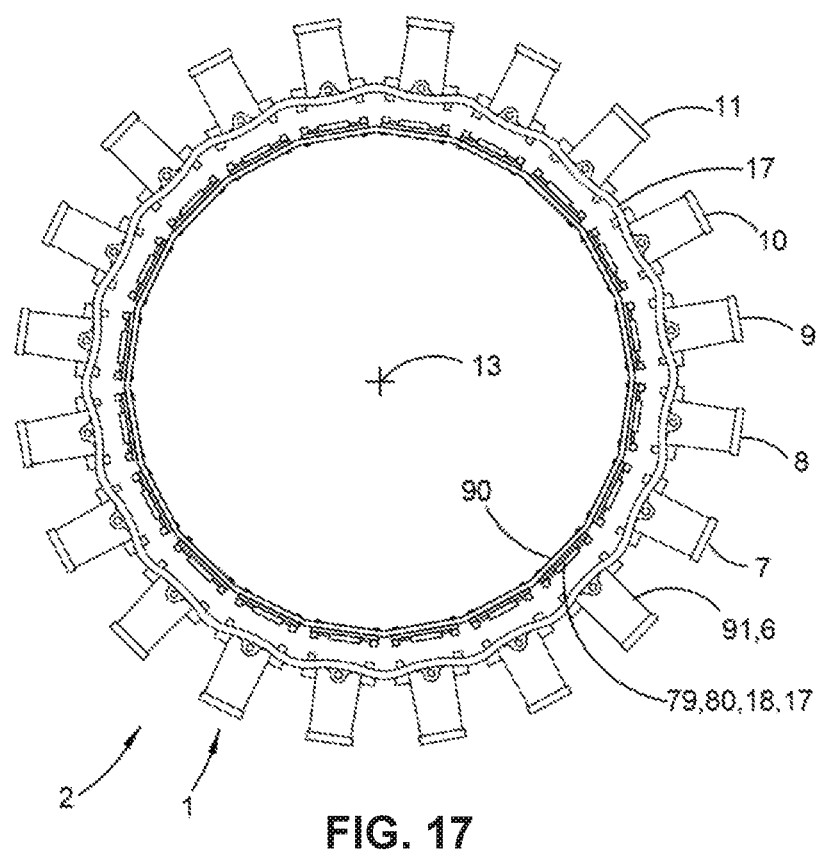
FIG. 17 is a top view of the camera array used in the tracking system of FIGS. 1, 13 and 14.
Figure 18:
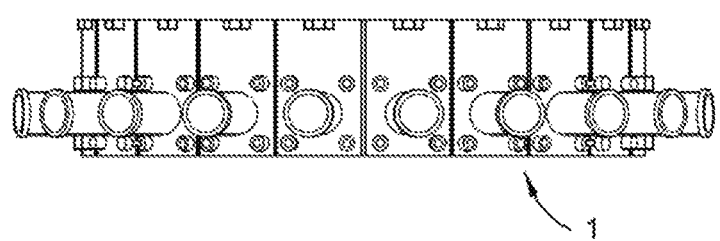
FIG. 18 is a side view of the camera array of FIG. 15.
Figure 19:
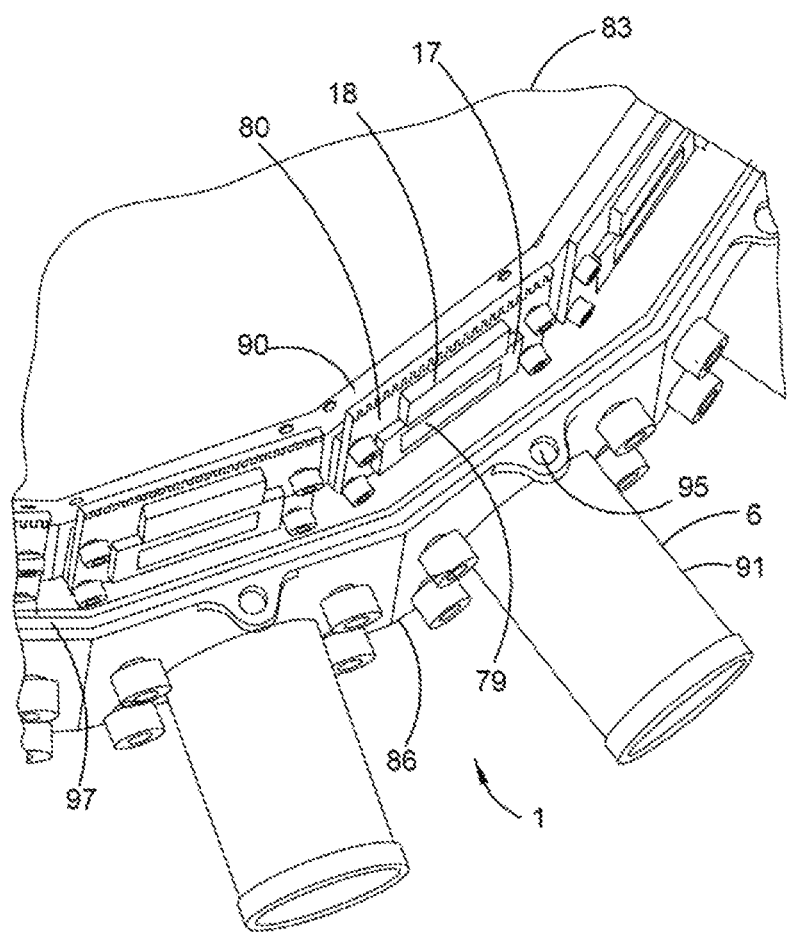
FIG. 19 is a detailed perspective view of the camera array of FIG. 15.
Figure 20:
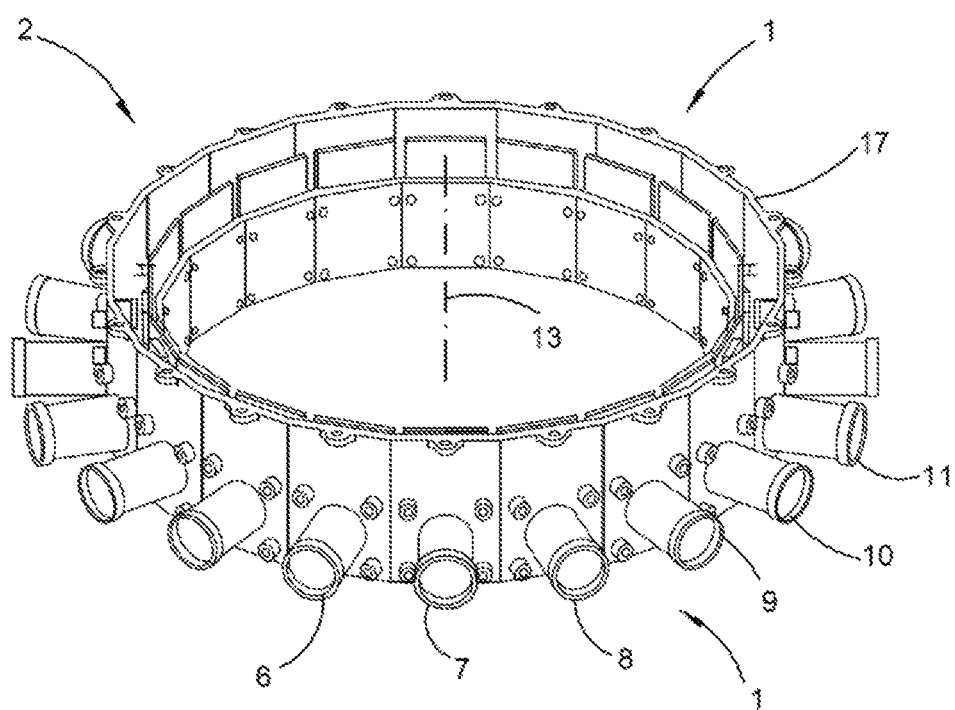
FIG. 20 is an isometric view of the camera array of FIG. 15.

FIG. 16 shows an embodiment of the tracking system 117 in which three single targets 111, 112, 113 are placed around a working area 114. For set up the camera array 1 is sequentially positioned at three precisely known positions and orientations 118, 119 and 120 on a set up jig 121. Each set up position 118, 119 and 120 may be provided with a coded transducer, not shown to communicate with the 6 DOF position and velocity FPGA module 18, the current position, 118, 119, or 120 of the camera array on the set up jig 121. The set up jig 121 provides a known linear scale to the triangular measurements taken of the targets 111, 112 and 113 during set up at the known positions and orientations 118, 119 and 120. By known surveying or navigation calculations, the 3D positions of the targets 111, 112, 113 can be determined. The set up jig 121 can then be removed and the 6 DOF tracking system 117 can then determine the position and orientation of the camera array 1, relative to the fixed targets 111, 112, 113. An advantage of embodiment 117 is that only simple targets 111, 112, 113 are required and no laser tracker 115 (see FIG. 15) is required. The disadvantage is that the set up jig 121 must be set up and the camera array 1 must be moved to the three known positions 118, 119, 120.

It should be noted that the camera array 1 could be moved manually or could be moved by a motorised stage or robot not shown.

Figure 21:
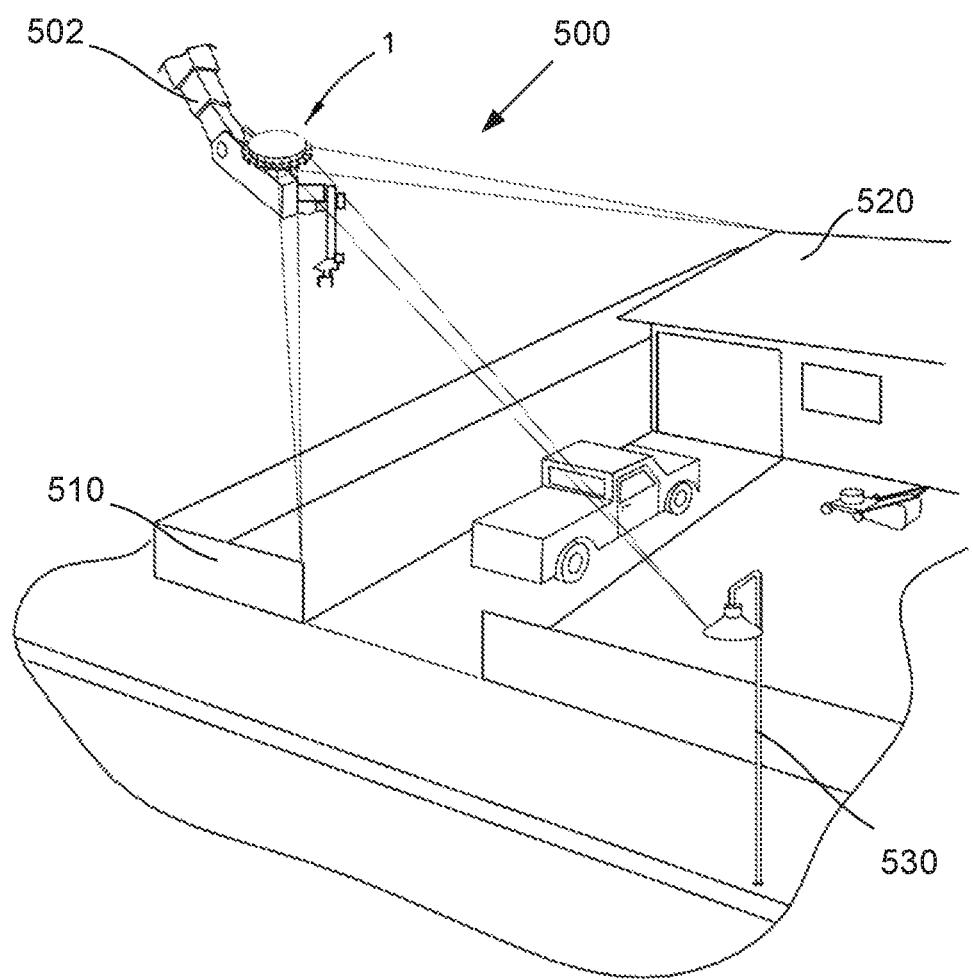
FIG. 21 is a schematic perspective view of a further example of a tracking system for tracking the position and/or orientation of an object in an environment; and, FIG. 22 is a flow chart of an example of a method for tracking the position and/or orientation of an object in an environment.

Referring now to FIG. 21, there is shown a tracking system 500 including a camera array 1 mounted to an object 502 such as a robotic arm. In this example, the cameras of the camera array 1 determine the position and orientation of the object 502 via targets 510, 520, 530 that are fixed reference points in the environment. The targets, in this case part of a roof fence and street lamp are targets that would be selected by the processing device of the system as being suitable targets for use by the system. The targets would be imaged in an initial image capture of the environment and then suitable machine learning or artificial intelligence algorithms would be used to identify objects in the image and select certain objects as being suitable for use as targets, for example, in accordance with predefined target rules. Such target rules might include for example not using transient objects as targets that are likely to move either in the environment or entirely out of the environment. For example, items like cars and lawnmowers or animals like birds or dogs (or people) should not be used as targets whereas static objects like roofs, windows or other structural parts of buildings would be suitable. The system would therefore be able to perform image processing to discern what objects are in the image and then select suitable objects for use as targets (discernible parts thereof such as corners for example).

The system 500 would then generate a map of the environment during initial calibration of the robot in the environment to position the computer generated targets in the environment. As the object moves throughout the environment, the camera array images some of the selected targets for reference points used in the determination of the position and orientation of the object. Such a system is advantageous as it does not require targets to be manually positioned in the environment by a user and does not require any special type of target design as the targets already exist in the environment in which the object such as a robot is operating.

Figure 22:
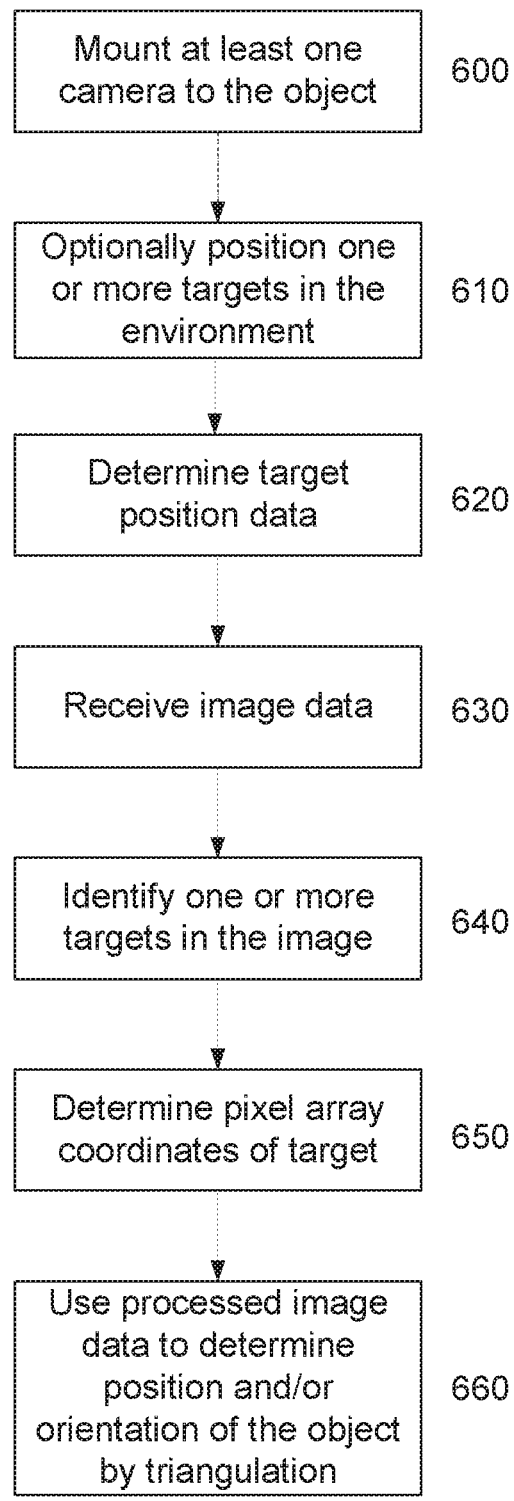

Referring now to FIG. 22, a method of tracking the position and/or orientation of an object in an environment shall now be described.

In this example, at step 600, the method includes mounting at least one camera to the object so that at least some of a plurality of targets are viewable by the at least one camera when the object is located in an operating position in which its position and/or orientation is to be determined.

At step 610 the method includes optionally positioning the targets in the environment, for example when the targets are manually placed by a user such as target arrays and the like. Alternatively, the system is able to deduce its own targets which pre-exist in the environment using artificial intelligence or other type of image recognition algorithm.

At step 620, the method includes in one or more electronic processing devices determining target position data indicative of the relative spatial position of the targets. This data comprising the relative spatial position of the targets may be manually input to a processing device by a programming interface such as a keypad or may be provided as data measured by surveying equipment such as a total station used to survey the environment (e.g. a building site) once the targets have been placed. Alternatively, the target position data may be determined by creating a cartesian map of the environment with computer selected targets (such as fixed landmarks or reference points in the environment) forming part of the map and their positions determined relative to an environment coordinate system assigned to the map.

At step 630, the method includes in the one or more electronic processing devices receiving image data indicative of an image from the at least one camera, said image including at least some of the targets. At step 640, the image data is processed to identify one or more targets in the image and determine pixel array coordinates corresponding to a position of the one or more targets in the image at step 650.

Finally, at step 660 the processed image data is used to determine the position and/or orientation of the object by triangulation.

Accordingly, it will be appreciated that in at least one example the above described tracking system provides a useful alternative to known tracking systems that is cheaper to implement, as it provides a camera based alternative to a more common laser tracker based measurement system. The system preferably uses an array of cameras imaging a plurality of sufficiently spaced apart targets in the environment to ensure that the triangulation problem is always well conditioned so that location can be determined to a high accuracy.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A tracking system for tracking the position and/or orientation of an object in an environment, the tracking system including:
 a) at least one camera mounted to the object including a body attachable to the object, the body having a camera array including a plurality of spaced apart cameras each having a field of view with a central axis, with the central axis of adjacent spaced apart cameras being divergently spaced by a predetermined fixed angle;
 b) a plurality of spaced apart targets, at least some of said targets viewable by the at least one camera, wherein the fields of view of adjacent cameras are at least partially overlapping so that at least some cameras can each view one or more common targets; and,
 c) one or more electronic processing devices configured to:
  i) determine target position data indicative of the relative spatial position of the targets;
  ii) receive image data indicative of an image from the at least one camera, said image including at least some of the targets;
  iii) process the image data to:
   (1) identify one or more targets in the image;
   (2) determine pixel array coordinates corresponding to a position of the one or more targets in the image; and,
  iv) use the processed image data to determine the position and/or orientation of the object by triangulation.

2. The system of claim 1, wherein the camera array includes two or more cameras mounted around the object in a distributed arrangement.

3. The system according to claim 1, wherein the plurality of cameras are spaced radially apart with their central axes lying in a common plane.

4. The system according to claim 1, wherein the body is spherical and the camera array includes a plurality of cameras arranged about the spherical body with their central axes spaced at predetermined angles.

5. The system according to claim 1, wherein a target defines at least one of:
   a) an individual point target; and,
   b) a target array comprising a plurality of point targets.

6. The system according to claim 5, wherein the plurality of spaced apart targets are at least one of:
   a) user generated targets that are manually set up in the environment at predetermined locations by the user; or
   b) computer generated.

7. The system according to claim 6, wherein the plurality of spaced apart targets include a plurality of target arrays of predetermined configuration, each of the target arrays having at least three targets spaced apart from each other by predetermined distances.

8. The system according to claim 7, wherein a target array has a unique spaced apart configuration of targets, compared with any other target array.

9. The system as claimed in claim 7, wherein a target array includes at least one of:
   a) an upright mast on which the at least three targets are disposed in a spaced apart and colinear arrangement; or
   b) a cross having upright and horizontal members each supporting a plurality of targets disposed in a spaced apart and colinear arrangement;
   wherein the targets are arranged on each mast or cross spaced apart from each other according to unique predetermined target spacings for each mast or cross.

10. The system according to claim 6, wherein the plurality of spaced apart targets one or more of:
   include at least two target arrays manually locatable in predetermined spaced apart positions, viewable by the camera array when the object is located in an operating position in which its position and orientation is to be determined; or
   are arranged in configurations selected from one or both of:
      a) spaced apart along a straight line; and,
      b) spaced apart in two intersecting lines.

11. The system according to claim 1, wherein the targets are lights that are time synchronised to switch on and off at defined intervals to thereby allow a camera imaging a target to identify the target that is imaged.

12. The system according to claim 1, wherein the body includes a surveying target viewable by a surveying instrument to determine the position of the body relative to the surveying instrument, and wherein the surveying instrument is selected from one of a theodolite such as a total station, or a laser tracker.

13. The system according to claim 12, wherein the camera array is used to determine the orientation of the body.

14. The system according to claim 1, wherein the at least one camera images the environment and the one or more electronic processing devices are further configured to:
   a) receive the image data from the at least one camera; and,
   b) analyse the image data to:
      i) identify a number of potential targets using image recognition algorithms;
      ii) select a plurality of the potential targets for use by the tracking system based at least in part on a set of target rules; and,
      iii) determine a position and orientation of the selected targets in the environment.

15. The system according to claim 14, wherein the targets are fixed reference points in environment, and wherein the one or more electronic processing devices create a map of the environment including the selected targets, the map being created during initial setup of the object in the environment.

16. The system according to claim 14, wherein a user can at least one of:
   a) select the targets based on a number of potential targets identified by the one or more electronic processing devices; or,
   b) override, confirm or delete targets selected by the one or more electronic processing devices.

17. The system according to claim 14, wherein as the object moves and the at least one camera images the environment, the one or more electronic processing devices are configured to analyse image data to identify at least some of the selected targets for use in position and/or orientation determination.

18. The system according to claim 1, wherein the system includes at least one initial reference target at a known location in the environment and wherein the one or more electronic processing devices are configured to:
   a) determine the position and/or orientation of the object by imaging the at least one initial reference target; and,
   b) determine the position and/or orientation of one or more random targets at unknown locations in the environment using the determined position and/or orientation of the object.

19. The system according to claim 18, wherein the initial reference target is removed after a predefined number of random targets have been positioned in the environment by the one or more electronic processing devices, and wherein the system establishes new targets as the object moves through the environment.

20. The system according to claim 1, wherein a target position in an image is determined by the one or more electronic processing devices analysing pixel target saturation, to determine pixel array coordinates for the centre of the target.

21. The system according to claim 5, wherein the targets use colour to distinguish individual targets in a target array.

22. The system according to claim 1, wherein triangulation is performed on the processed image data to determine at least the distance between a target and a camera.

23. The system according to claim 22, wherein the pixel array coordinates corresponding to the position of a target are determined to sub-pixel resolution.

24. The system according to claim 23, wherein the pixel array coordinates corresponding to the position of the target in the image are indicative of angular data representing a target heading angle and an elevation angle.

25. The system according to claim 23, wherein previously stored images are analysed by the one or more electronic processing devices to determine a rate of change of the target heading angle and target elevation angle for use in determining the velocity of the object.

26. The system according to claim 23 or claim 24, wherein the system further includes a look-up table of calibration data stored in memory of the one or more electronic processing devices, the calibration data including pixel position values and range correlated to camera focusing data, so that observed target pixel array coordinates have camera focusing data applied to thereby apply range correction in the determination of distance to targets.

27. The system according to claim 1 wherein the at least one camera is a digital camera having one of:
   a) a charge-coupled device (CCD) image sensor; or
   b) a complementary metal oxide semiconductor (CMOS) image sensor;
   wherein the or each camera is connected to a dedicated image processor for processing the image data from the camera.

28. The system according to claim 27, wherein the image processor of each camera sends data via a data bus to a dedicated position and velocity processor that determines the position, orientation and velocity of the object.

29. The system according to claim 28, wherein the position and velocity processor outputs data to a control and logging system via a fieldbus link.

30. The system according to claim 1, wherein the system includes at least one of:
   at least two cameras viewing at least two targets so that the triangulation is well conditioned to increase positional accuracy; or
   an array of cameras and targets so that as position and orientation of the object changes, the triangulation remains well conditioned.

31. A method of tracking the position and/or orientation of an object in an environment, the method including:
   a) mounting at least one camera to the object so that at least some of a plurality of targets are viewable by the at least one camera when the object is located in an operating position in which its position and/or orientation is to be determined;
   b) mounting a camera array to the object, the camera array including a plurality of spaced apart cameras each having a field of view with a central axis, with the central axis of adjacent spaced apart cameras being divergently spaced by a predetermined fixed angle; wherein the fields of view of adjacent cameras are at least partially overlapping so that at least some cameras can each view one or more common targets; and,
   c) the method further including in one or more electronic processing devices:
      i) determining target position data indicative of the relative spatial position of the targets;
      ii) receiving image data indicative of an image from the at least one camera, said image including at least some of the targets; and,
      iii) processing the image data to:
         (1) identify one or more targets in the image;
         (2) determine pixel array coordinates corresponding to a position of the one or more targets in the image; and,
      iv) using the processed image data to determine the position and/or orientation of the object by triangulation.

32. The method according to claim 31, wherein the camera array includes at least two cameras that are at least one of:
   a) housed in a body attached to the object; and,
   b) distributed around the object.

* * * * *